United States Patent [19]

Keller, Jr.

[11] Patent Number: 4,639,223

[45] Date of Patent: Jan. 27, 1987

[54] SIMULATED HEART DISPLAY SYSTEM

[76] Inventor: J. Walter Keller, Jr., 8600 SW. 54th Ave., Miami, Fla. 33143

[21] Appl. No.: 688,194

[22] Filed: Jan. 2, 1985

[51] Int. Cl.$^4$ ............................................. G09B 23/28
[52] U.S. Cl. .................................... 434/272; 434/278; 128/695; 364/417
[58] Field of Search ................ 128/695, 696; 364/413, 364/417, 801, 806; 358/104; 434/278, 267, 268, 272

[56] References Cited

U.S. PATENT DOCUMENTS 4,091,549  5/1978  Driller et al. ............................ 35/17
4,352,163  9/1982  Schultz, Jr. et al. ............... 364/417

OTHER PUBLICATIONS

*Pace*, vol. 8, Jul.–Aug. 1985, pp. 579–588, Malik, Nathan, and Camm, "Computer Simulation of Dual Chamber Pacemaker Algorithms Using a Realistic Heart Model".

*Computers and Biomedical Research*, vol. 16, No. 5, Oct. 1983, Malik, Cochrane, and Camm, "Computer Simulation of the Cardiac Conduction System".

*Proceedings of the National Academy of Sciences*, vol. 81, No. 1, Jan., 1984, pp. 233–237, Smith and Cohen, "Simple Finite-Element Model Accounts for Wide Range of Cardiac Dysrhythmias".

*Primary Examiner*—Leo P. Picard
*Attorney, Agent, or Firm*—Lane & Aitken

[57] ABSTRACT

In a heart display system a computer is operable to simulate different selected hearts, each with a different pattern of electrophysiological pathways, which conduct waves of depolarization. The computer determines the conduction in the pattern of pathways of a selected heart in accordance with selected parameters and inputs provided by the operator. In simulating the heart, the computer determines whether a depolarization wave proceeds from one pathway segment to an adjacent segment by examining whether the adjacent segment is polarized or depolarized and determines that the depolarization wave proceeds only if the adjacent segment is polarized. The operation of the simulated heart is displayed by showing an animation of the conduction of the depolarization waves in the pattern of electrophysiological pathways of the selected heart, by an ECG, and by a ladder diagram.

23 Claims, 20 Drawing Figures

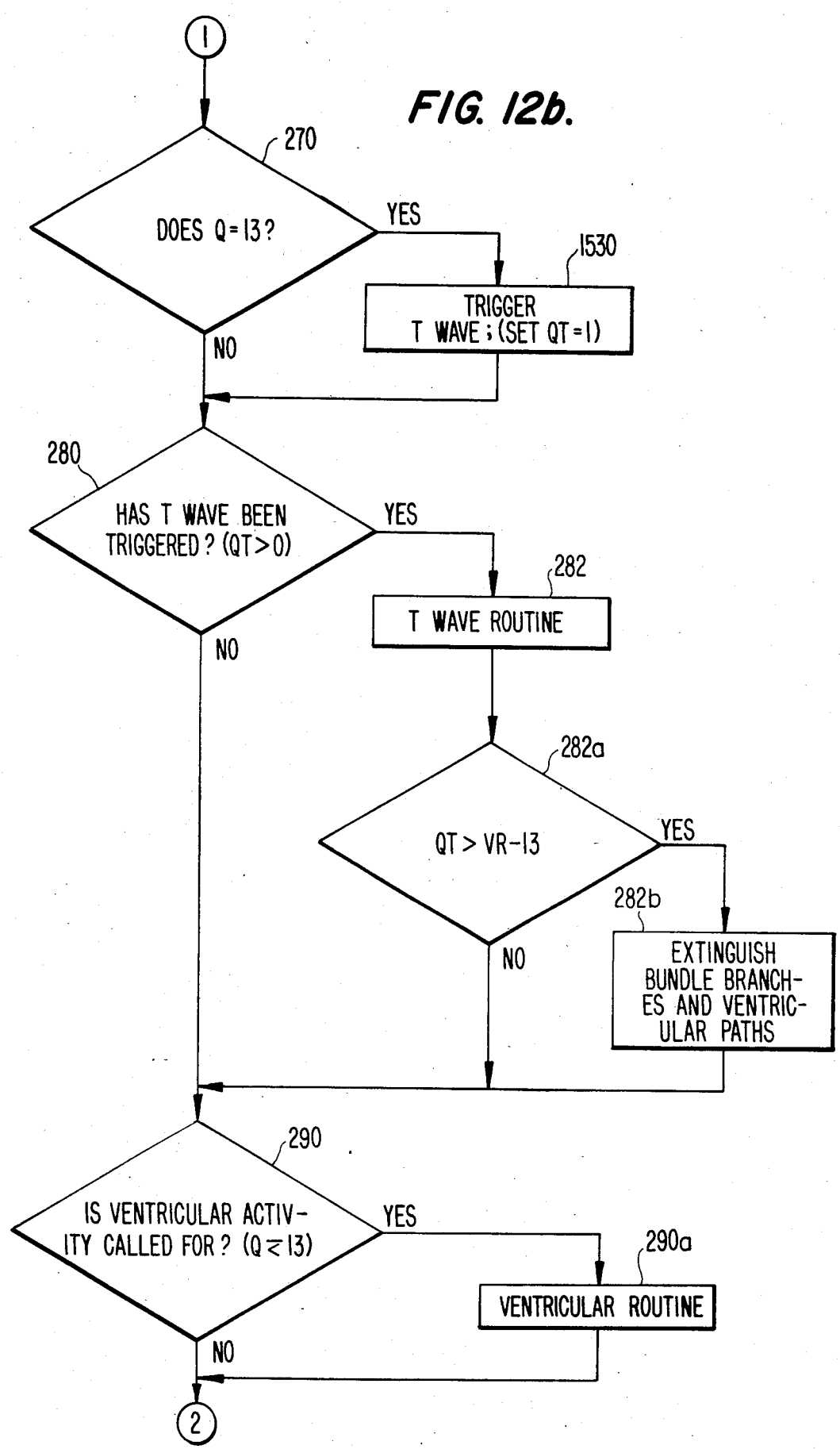

SIMULATED HEART DISPLAY SYSTEM

BACKGROUND OF THE INVENTION

This invention relates to a heart display system and more particularly to a system which simulates the electrophysiological process in the heart and displays a representation of the simulated process.

The operation of heart depends on a process of polarization and depolarization in nervous pathways and muscular tissue in the heart.

Living cells are made up of an ion enclosing membrane, which in its resting state has a −90 millivolt difference in voltage between the inner and outer wall. In this condition the cell is considered polarized. When excited the cell depolarizes by the dielectric strength of the wall breaking down and ions flowing across the barrier. This causes a contraction of muscular cells. But, particularly in cardiac muscle and nervous conduction paths, a cell that depolarizes also triggers its neighbor to depolarize in a chain reaction until the entire nervous path or area of muscular tissue is involved. The chain reaction causes the depolarization to travel in a wave through the nervous pathways and the muscular tissue and in this manner electrical impulses are conducted through the heart. Cells remain depolarized for only a short period of time, called the refractory time, and then the cell wall barrier is again established with a restoration of a net flow of negative ions to the inner cell until a −90 mv equilibrium is reached. Only during the charged or polarized state is the cell capable of being activated or depolarized.

If a portion of the atrium, ventricle, or a conducting nervous path is depolarized that portion cannot conduct an impulse until it has recovered. If depolarized cells are in the line of conduction of new depolarization activity, the activity stops at the barrier comprising the depolarized cells.

A single normal heart contraction results from the spontaneous excitation of the cells in the upper right atrium called the sinus node. This particular node acts as a natural physiologic pacemaker of the heart and is influenced by the brain and nervous system of the body. Its electrical activity spreads throughout the atrium with a conduction velocity determined by the anatomy and chemical environment of the atrium at the time. The spread of the depolarization wave through the atrial walls causes the atrial muscle to contract and carry out the atrial pumping action. The speed of conduction, upon reaching the atrio-ventricular node (AV node) of the heart, considerably slows. After passing through the AV Node the activity proceeds through nervous fibers called the His bundle, the right and left bundle branches and then through many parallel exits to the ventricular myocardium. The depolarization wave then spreads through the muscular tissue of the ventricle to cause the ventricle to contract producing the ventricle pumping action. All of this activity is very fast compared to the rate of conduction through the AV node. Thus, the mechanical pumping of the ventricle is delayed from the pumping of the atrium to permit the atrium to contribute substantially to the filling of the ventricular chambers.

Many factors contribute to the rate of the heart and the conduction sequence of the normal heart, and many more factors become involved with abnormal and diseased hearts. Hearts can acquire concealed paths of conduction, or longitudinally diassociated paths resulting in two conduction paths where one normally exists. Conduction velocities and refractory periods can change radically with disease. Conduction blocks can take place so that activity will not proceed past certain barriers. Irritable cells can develop almost anywhere in the heart and start rhythmic depolarizations which can propagate throughout the heart producing pacemaker action conflicting with normal rhythm.

As indicated above, the activity of the heart normally originates from the sinus node. However, despite the origin of a beat, the activity spreads from an excited cell like a wave spreads from a stone splash in a pond, or more analogously, like falling dominos set up in close proximity. If neither neighbor on either side of a domino falls then the domino remains standing. If neither neighbor of a cell depolarizes, a cell remains quiescent, (except for a spontaneously depolarizing cell). If a domino is down and there is no path of dominos around the fallen or missing domino, activity will stop at the break. If there is a dead cell in a conducting link, or if the cell has not yet recovered by the time that new activity arrives, such activity will be blocked.

The sequence of normal cardiac activity involves a first atrial contraction followed closely by ventricular contraction at a rate depending upon physiologic needs. However, with irritable foci and/or diseased aberrant pathways, the electrical conduction sequence of the heart can assume bizarre sequences and rhythm, which can be dangerous. The characteristics of the heart's electrophysiologic conduction system and the resulting rhythms and arrhythmias can be very complex. It is often difficult or impossible to definitively identify the mechanisms actually responsible for specific arrhythmias seen on the patient's electrocardiogram.

At the present time physicians encountering difficult arrhythmias will order electrophysiologic studies of the patent. These studies involve monitoring the electrocardiagraphic voltages at multiple sites on the heart during electrical stimulation, which is meant to provoke or stop such arrhythmias. These studies may be carried out while the patient is affected by specific drugs. From these data the physician tries to create a series of diagrams which model the conduction system of the heart of the patient and yield the precise mechanisms involved. This is a time consuming process and lacks ease in testing postulated parameters and their possible variations.

As explained above, the electrophysiology of the heart is a relatively complex study. Medical students have difficulty in understanding the basic principles of cardiac conduction activity and resulting cardiac rhythms and the multiple variations that exist in this activity. Even the expert cardiac electrophysiologists has difficulty in visualizing the precise mechanisms possible in contributing to complex arrhythmias, particularly when there are multiple pathways in the heart with rate and interval dependent parameters.

The usual presentation of an arrhythmia problem includes slides or pictures of a multichannel ECG including intracardiac electrograms from different sites of the heart. Frequently these electrograms are accompanied by postulated ladder diagrams displaying the conduction sequence and pattern representing the rhythm. Comprehension of the presented rhythm requires careful examination of the whole picture with extensive consideration and thought aided by an accompanying oral presentation or written text. The learner frequently saves time by taking the authors explanation on faith, consequently sometimes learning only the superficial lesson without the subtile aspects that could later contribute to his intuitive grasp of cardiac rhythm variations encountered in practice.

SUMMARY OF THE INVENTION

The present invention provides a computer simulation or model of a heart, determines what happens electrophysiologically in the simulated heart as the heart operates, and displays a representation of the conductive pathways of the heart with animation of the polarization and depolarization that takes place in the pathways and thus, of the propagation of conduction in the pathways by the chain reaction effect of the depolarization. In addition, an ECG wave form and a ladder diagram are generated to represent the activity taking place in the simulated heart. The operator of the system can select a heart with normal or aberrant pathways, and can select different parameters for operation of the heart. The sinus rate, which is the rate that the sinus node periodically spontaneously depolarizes, can be specified. In addition, a ventricular escape rate, which is the rate that a spontaneous depolarization takes place in the ventricle can be specified. Conduction velocities, cellular refractory times and sites of conduction block can be specified. The operator can specify a type of pacemaker and also a type of drug being employed.

The simulated heart does not predetermine or specify a particular arrhythmia or sequence or pattern of depolarization activity. Instead, a pattern of conductive pathways within the heart is specified along with selected parameters and the program then determines the resulting rhythm and pattern activity from the parameters, operator intervention and the pattern of conducting pathways within the heart. More specifically, as activity takes place and a given cell is determined to have depolarized in the simulated heart, the system examines the adjacent cell area in the pathway and determines whether or not the next cell area is depolarized. If the cell space is depolarized, it means that the conduction cannot proceed in that direction. If the next cell site is polarized, then the system stimulates depolarization of the next cell site and the depolarization chain reaction continues.

The system of the invention in this manner can correctly simulate and depict a large number of different complex patterns of activity and arrhythmias that results from variations in parameters and operator intervention. As a result, the student or practitioner not only gains more easily an understanding of the electrophysiology of the heart, but also can more readily determine how changes in parameters can cause changes in the electrophysiological activity pattern. Thus, the practitioner is provided with a valuable data to diagnose the cause or causes of a particular abnormal heart condition and as well as in determining what treatment should be provided to overcome the condition.

Accordingly an object of the present invention is to provide an improved system for displaying heart operation.

Another object of the present invention is to simulate the electrophysiology of a heart in operation.

A further object of the present invention is to display a representation of the electrophysiology of a simulated heart in operation.

A further object of the present invention is to display an animated representation of the electrophysiological pathway of a simulated heart in operation.

A further object of the present invention is to facilitate diagnosis and treatment of abnormal heart conditions.

Further objects and advantages of the present invention will become readily apparent as the following detailed description of the invention unfolds and when taken into conjunction with the drawings.

BRIEF DESCRIPTION OF THE DRAWINGS

FIGS. 12a-12f represent a flow chart employed by the system of the present invention to produce a display representing a simulated heart with dual pathways.

DESCRIPTION OF A PREFERRED EMBODIMENT

Figure 1:
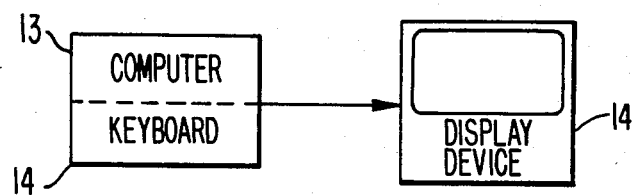
FIG. 1 is a block diagram of the system of the invention.

As shown in FIG. 1, the system of the invention comprises a cathode ray display device 11 controlled by a computer 13 with an alpha-numeric keyboard 14. The computer 13 is programmed to simulate the electrophysiology of a heart in operation by defining a selected pattern of pathways for the electrophysiological conduction in the heart and determining and keeping track of the depolarization and recovery of cell areas in the pathways as this activity would occur in a functioning or malfunctioning heart. In this manner, the programmed computer simulates the electrophysiological conduction that occurs in the defined pathways. The computer controls the display device 11 to produce an animated display of a representation of the heart anatomy and in particular, a display of the electrophysiological pattern of pathways in the heart arranged in accordance with the physical location of these pathways in an actual heart and also to display in the pathways an animation of the polarization and depolarization that occurs in the pathways as the heart functions. In addition, the computer 13 controls the display 11 to produce an electrocardiogram (ECG) and a ladder diagram corresponding to the operation of the simulated heart.

Figure 2:
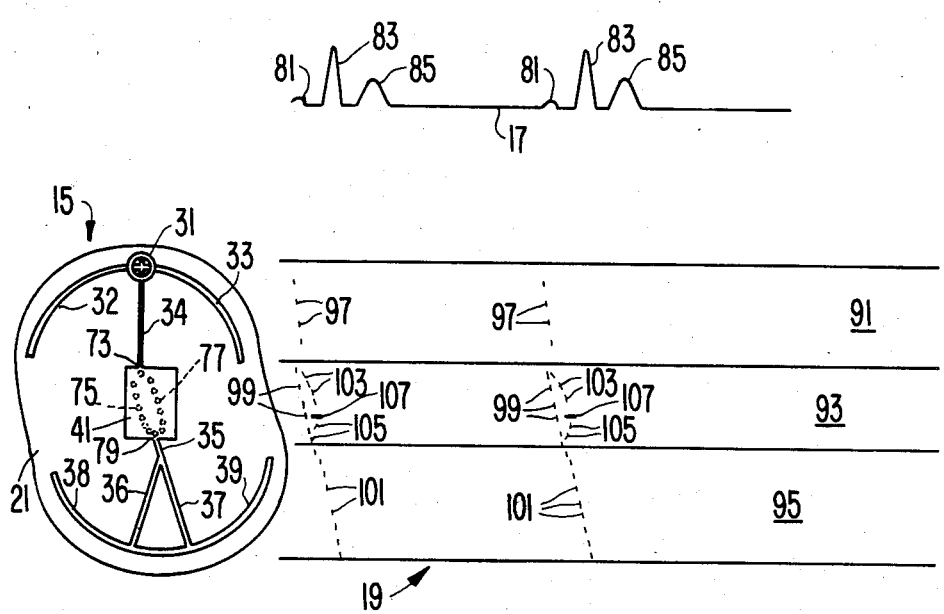
FIG. 2 is an illustration of the display produced by the system of the invention.

FIG. 2 illustrates the display produced by the display device after the completion of ventricle activity and after all of the heart pathways have become repolarized, before the start of a next atrial contraction. The display comprises an anatomical depiction 15 of the simulated heart, a depiction 17 of the ECG wave form produced by the simulated heart, and a corresponding ladder diagram 19. In the heart depiction 15, the heart is represented by a red oval 21, which is filled in except for electrophysiological pathways 31 through 39 in the atrium and ventricle of the heart and a window 41 in the middle of the heart, in which the atrioventricular node is located. The pathways 31 through 39 when polarized are defined by being the background color of the screen, which is blue, surrounded by the filled in red color of the oval 21 representing the heart. When a cell area becomes depolarized, the corresponding part of the pathway in the display is changed to a yellow color. When a pathway segment of the display is yellow representing a depolarized condition, it is referred to as being lit. When the cell repolarizes it returns to the background blue color of the display.

Within the window 41, the AV node also contains a pathway or pathways represented by points extending across the window 41, which can be lit to the yellow color representing depolarization of cell area in the pathway or pathways of the AV node. As with the pathway 31 through 38, these pathway points in the AV node will be background color when they are polarized and will be lit to a yellow color when they are depolarized. At the time of the heart beat cycle represented in FIG. 2, the pathways in the AV node are unlit so that would be invisible. In FIG. 2 two pathways designated 75 and 77, are represented in the AV node and are shown in phantom.

In normal operation, spontaneous depolarization occurs in the atrium of the heart at the sinus node, which is represented in the by the circled cross 31 in the display. The depolarization of the sinus node causes a chain reaction of depolarization that travels down through paths in the atrium wall represented by pathways 32 and 33 causing the muscles of the atrium to contract and effecting an atrial pumping action. The depolarization wave also travels down through the atrial link, represented by pathway 34 to the proximal junction 73 of the AV Node. Then at a slower rate, the depolarization wave travels through the pathway of the AV Node to the His bundle, represented by pathway 35, which connects to the distal junction 79 of the AV Node. The depolarization wave then propagates rapidly through the His bundle 35 in the ventricle and then through the right and left bundle branches represented by the pathways 36 and 37 to the ventricular myocardium. The wave of depolarization then travels through the muscular tissue in the wall of the ventricular and causes the muscles of the ventricle to contract and carry out the pumping action of the ventricle, thus completing the heart beat. In the display the pathways 38 and 39 represent the conductive pathways for depolarization in the ventrical wall. The next heart beat will then occur when the sinus node spontaneously depolarizes.

In a normal heart there will be a single pathway in the AV Node extending from the atrial link 34 to the His bundle 35. In the specific embodiment of the present invention, the operator can select simulated hearts with three different pathway patterns. One pathway pattern to be selected is a normal heart, which has the single pathway in the AV Node. A second heart, which can be selected is one which has two parallel pathways in the AV Node, one pathway of which, called the fast path, propagates the wave of depolarization faster than the other path, called the slow path. This heart is illustrated in FIG. 2. A third heart, which can be selected in the specific embodiment is a heart with the Wolf-Parkinson-White-Syndrome, in which an electrophysiological pathway called a Kent path, exists in the wall of the heart between the ends of pathways in the muscular tissue in the wall of the atrium and ventricle. For example a Kent path can exist between the pathways 32 and 38 so that when a wave of depolarization travels down the path 32 it then travels across the Kent path in the wall of the heart into the path 38 in the right ventricle and thus, causes the wave of depolarization to continue in the reverse direction through the right ventricle path 38.

In the simulated heart, as in a real heart, should a spontaneous or stimulated depolarization occur in the ventricle, the depolarization will travel in reverse direction up through the bundle branch 36 or 37 or both, then through the His bundle 35 in the reverse direction to distal junction 79 of the AV node 41. From the distal junction the depolarization wave could travel in the reverse direction to the atrium and cause depolarization in the atrium. This wave propagation will occur if the cells in these pathways are not already depolarized or the pathways are not otherwise blocked.

Figure 3:
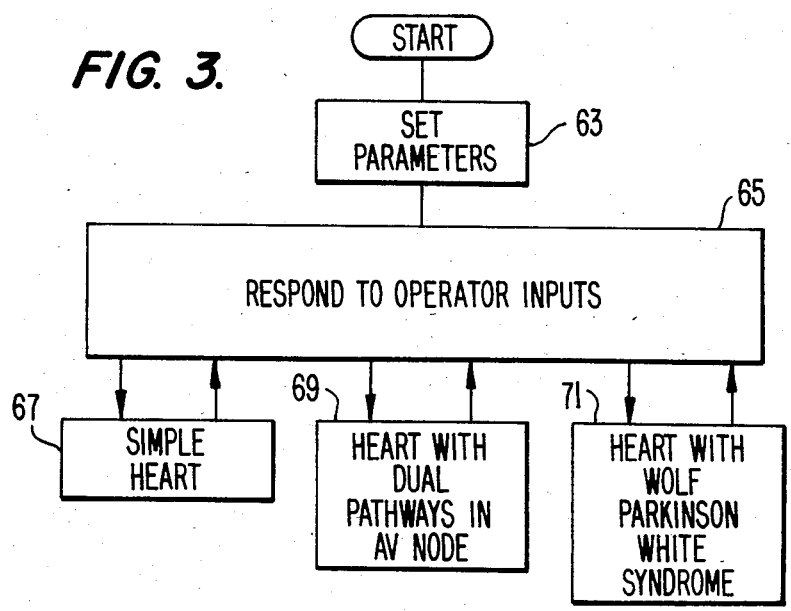
FIG. 3 illustrates a flow chart of the computer program employed in the present invention.

FIG. 3 is a flow-chart diagram of the program employed by the computer 13 to produce the display of the present invention in accordance with the specific embodiment of the present invention. The source code listing in IBM BASIC of the program represented by the block diagram of FIG. 3 is found in the appendix to the specification.

The program listing in the appendix is a full disclosure of the program to simulate each of the three hearts of the program. However, to provide a fuller understanding of the invention, the operation of the program for the most complex heart, the heart with the dual channels in the AV node, will be explained in detail. The programs for the simple heart and the heart with the Wolfe-Parkinson-White Syndrome operate in a similar manner and accordingly can be readily understood from the listing for these programs in the appendix.

As shown in FIG. 3, the program first enters in sequence 63 in which parameters of the program are set to a nominal or starting value. The program then enters into instruction sequence 65 in which the program will branch to the instruction set for the selected heart. In the initial setting of the parameters in instruction sequence 63, the simulated heart will have been initially selected to be the simple heart. One of the operator inputs provided in instruction sequence 65 will be the selection of a different heart. The operator can select a different heart at any time by hitting the space bar, whereupon in instruction 65 the program will prompt the operator to depress the numeral 1 key if he wants the instruction set for the simple heart, to depress the numeral 2 key if he wants the instruction set for the heart with the dual pathway in the AV Node and to press the 3 key if he wants the heart with the Wolf-Parkinson-White Syndrome. If the simple heart is selected, the program will then enter instruction set 67 to being simulating operation of the simple heart. If the heart with dual pathway is selected, the program will branch into instruction set 69, whereupon the program will begin simulating this heart. If the heart with the Wolf-Parkinson-White Syndrome is selected, the program will enter instruction set 71 to begin simulating this heart. If the operator does not press the space bar then the operator will not be prompted to select a heart and the heart previously selected will continue to be simulated. If upon start-up and the first time the program enters into 65, no heart is selected, then the program will automatically enter into instruction set 67 to simulate the simple heart. In simulating each of the hearts, the program will repeatedly iterate through the set of instructions to carry out the simulation and on each iteration through this set, the program will also iterate through the instruction sequence 65 to give the operator an opportunity to select a different heart or to respond to other interventions by the operator via the key board 14.

Figure 4:
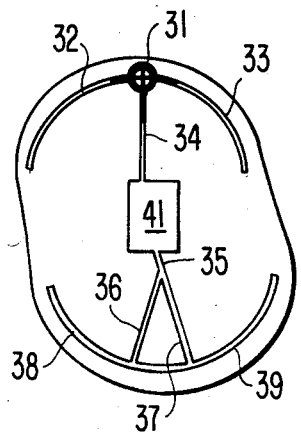
FIGS. 4-8 illustrate different stages of the display of the heart anatomy produced by the system of the present invention.
Figure 5:
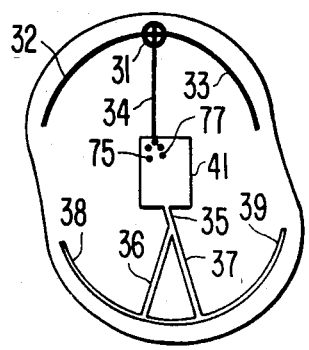
Figure 6:
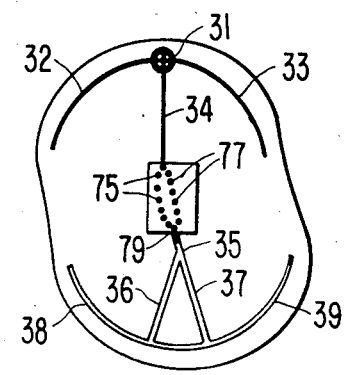

FIGS. 4–8 illustrate different stages of the display of the heart 21 for a normal heartbeat in the simulated heart with dual pathways in the AV node. FIG. 4 represents the condition of the display immediately after a spontaneous depolarization at the sinus node in the simulated heart has occurred. As shown in FIG. 4, the representation 31 of the sinus node is lit to the yellow color and the upper part of the pathways 32–34 are lit to represent depolarization. As the depolarization travels through the pathways 32 and 33 the atrial muscles contract producing an atrial beat. FIG. 5 represents the condition of the simulated heart after the depolarization wave has traveled through the proximal junction 73 of the AV node and has started propagating through the fast and slow pathways 75 and 77 of the AV node. As shown in FIG. 5, the fast and slow pathways are represented by spaced points in the window 41, which become visible when they are lit to a yellow color on the blue background of the window 41 and, which are invisible when they are unlit or polarized. FIG. 6 illustrates the condition in which the depolarization has traveled through the distal junction 79 where the slow and fast pathways 75 and 77 join the His bundle 35. As shown in FIG. 6, the entire fast pathway 75 is lit indicating that all the cell areas in the fast pathway have been depolarized. In addition, the top of the His bundle 35 is lit indicating that the depolarization has started down the His bundle pathway and the bottom of the slow pathway 77 is lit indicating that the depolarization has started up from the distal junction 79 in the reverse direction through the slow pathway.

Figure 7:
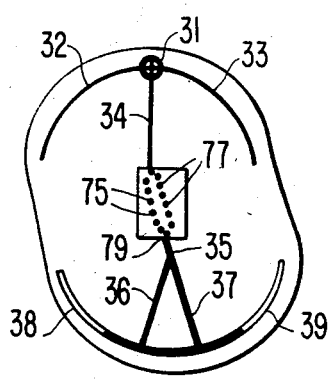

FIG. 7 shows the condition in which the depolarization has travelled down through the His bundle 35 through the left and right bundle branches 36 and 37 and into the pathways 38 and 39 in the left and right ventricle wall. In addition, the depolarization in the slow pathway has proceeded from the top and the bottom to a point of collision in the slow pathway so that the entire slow pathway 77 is depolarized. As shown in FIG. 7, the pathways 33–34 in the atrium, as well as the pathway 75 and 77 in the AV node, the His bundle pathway 35 and the pathways of the left and right bundle branches 36 and 37 remain lit in FIG. 7, showing that these pathways are still depolarized at the time the heartbeat reaches the condition shown in FIG. 7. As the depolarization wave travels up the pathways 38 and 39, the ventricle muscles contract, producing a ventricle beat.

Figure 8:
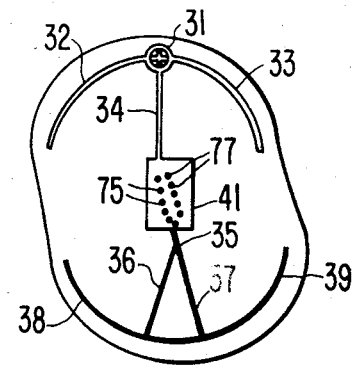

The pathways then recover and repolarize in the same sequence that they depolarized in normal heart operation and this is represented in the display by the representing of the pathways becoming extinguished by turning back to the blue color of the background. FIG. 8 illustrates the condition of the heart in which the atrium has become repolarized following the ventricle beat and the fast and slow paths 75 and 77 are beginning to repolarize. The ventricle paths remain depolarized.

In the ECG waveform display 17 (See FIG. 2) the P wave 81 is generated when the atrial paths 32–34 depolarize. The QRS wave 83 is generated as the paths 38 and 39 in the ventricle depolarize. The T wave 85 is generated when the ventricle repolarizes. If the atrial depolarization is ectopic, meaning that it proceeds in the reverse direction through the atrial link, such as would occur if it were triggered by a pacemaker of a PAC or by depolarization activity propagated from the AV junction, the P wave will be shown inverted. Similarly if the ventricle depolarization is ectopic wherein the depolarization wave travels through the His bundle in the reverse direction, the QRS wave will be shown inverted.

In the ladder diagram 19, as shown in FIG. 2, the top section 91 represents atrial depolarization activity, the middle section 93 represents depolarization in the AV node, and the bottom section 95 represents ventricular depolarization activity. As depolarization in the atrium proceeds, points in the atrial section 91 of the diagram are lit in sequence. When the depolarization takes place in the AV node, points are lit in sequence in the AV nodal section 93 in sequence. As the depolarization takes place in the ventricle, points are lit in ventrical section 95 in sequence.

If the depolarization is the normal direction, the sequence of lighting of the points is from top to bottom in each section. Thus in the ladder display of FIG. 2, the points 97 were lit in sequence in the atrial section 91 from top to bottom to represent a normal atrial beat. The points 101 were lit from top to bottom in sequence in the ventricular section 95 to represent a normal ventricle beat. When an ectopic beat occurs or when the conduction through the AV node is in the reverse direction, the points are lit in the corresponding section of the ladder diagram in the reverse direction. When there is a dual pathway in the AV node, as is the case in FIG. 2, the conduction in each pathway is represented by lighting a different set of linearly arranged points. Thus as shown in FIG. 2, conduction in the fast pathway is represented by the points 99, which were lit from top to bottom to represent antegrade conduction. Conduction in the slow pathway is represented by the points 103 and 105. The points 103 were lit from top to bottom representing conduction in the slow path in the antegrade direction from the proximal junction. The points 105 were lit from bottom to top to represent conduction in the retrograde direction from the distal junction as a result of the depolarization wave from the fast pathway traveling into the slow pathway through the distal junction. The lit horizontal line 107 represents a collision of the propagating waves from opposite ends in the slow path.

As successive heart beats occur, the P, QRS and T wave forms of the ECG are produced for each beat in succession displayed from left to right with time. The wave form from the previous beat is retained in the display, so that the wave form for several successive beats can be displayed simultaneously spaced across the screen. The ladder diagram display is produced for successive beats in a similar manner, spaced laterally across the screen. In the ladder diagram, each successive point is displaced to the right of the preceeding point for the same path so that the slope of the line defined by a series of points will represent the direction of conduction in the path. After the ECG and ladder diagram displays reach the edge of the screen, the ECG wave form and ladder display for the previous heartbeats are erased and the display starts over for the next beat.

In the simulated heart, when the wave propagation traveling down the atrial link 34 reaches the proximal junction 43, before starting the depolarization through the slow and fast paths 75 and 77 of the AV node, the computer program determines whether or not the first cell area of each path is lit, indicating that it is already depolarized and if so, the wave propagation does not proceed through that path. Similarly at each point along the fast and slow paths 75 and 77, the computer program tests the next point in the path to see if it is lit before proceeding with depolarizing that cell area in the simulated heart. Likewise, when the propagation through the slow path or the fast path reaches the distal junction 79, it tests the His bundle 35 to determine whether or not the His bundle is depolarized and tests whether the lower most point in the other path of the AV node is depolarized. If the lower most point in the other path is not depolarized, the propagation starts up the other path as illustrated in FIG. 6, but if it is already depolarized then the wave form, does not propagate into the other path. Similarly, if the His bundle 35 is depolarized, then the propagation of the depolarization wave does not proceed into the His bundle, but stops at the distal junction. Similarly, when propagation proceeds in the reverse direction, through the fast or slow path, to the proximal junction, the computer program determines whether or not the upper most point of the other path of the AV node is polarized or depolarized and then proceeds with the propagation into the other path or not, depending upon this test. In addition, the atrial paths are tested to determine whether or not they are refractory and if not, the depolarization wave proceeds through the atrial link 34 and then into the atrial paths 32 and 33.

Figure 9:
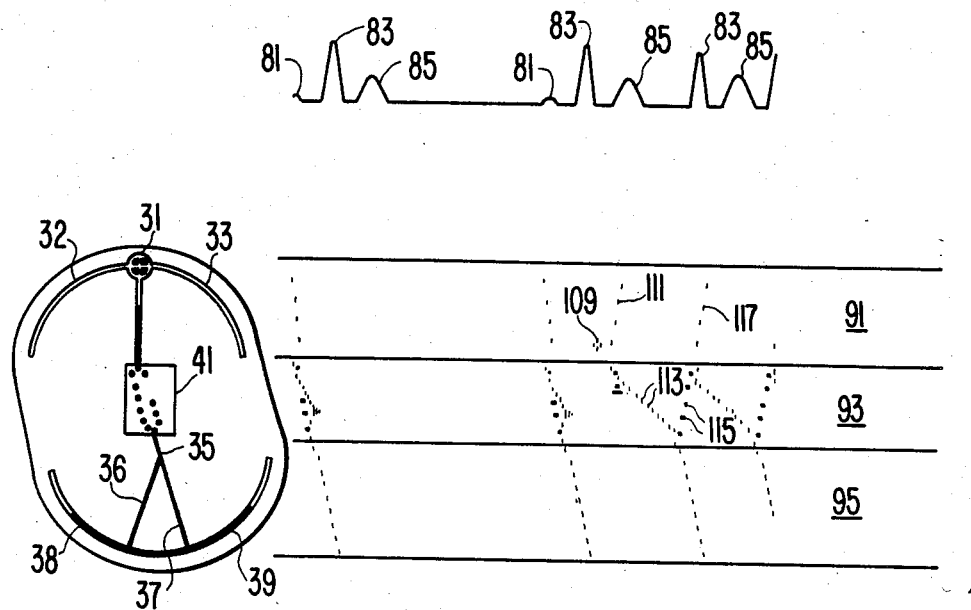
FIGS. 9-11 illustrate additional displays, which can be produced by the system of the present invention.

FIG. 9 illustrates a type of arrythmia, called reentry tachycardia, that can occur in a heart with the dual pathway in the AV node. The operator can provoke this reentry tachycardia, by introducing an intervention called PAC, which artificially stimulates an ectopic beat in the atrium before the fast pathway 75 has completed its repolarization. The wave from the artificial stimulation starts down the fast and slow pathways 75 and 77 as in a normal beat, but the depolarization in the fast pathway is blocked by this depolarization wave reaching a cell area in the fast path, which is not yet repolarized. In the meantime, the depolarization proceeds down the slow pathway 77 and at a slow enough rate that the progressive repolarization in the slow pathway stays ahead of the new depolarization wave, As a result the new depolarization wave in the slow pathway reaches the distal junction 79. By the time the new depolarization wave has traveled through the slow path, the fast path will have repolarized, so that starts up the fast pathway 75 from the distal junction 97. As a result, the new wave propagating through the fast path will reach the proximal junction, and trigger an ectopic depolarization of the atrium, which also will have repolarized by this time. In the meantime, the top of the slow pathway 77 will have again become polarized, so the wave continues propagation from proximal junction 73 into the top of the slow pathway 77. The wave will then continue to propagate circulating around the fast pathway and the slow pathway in the AV node and alternately triggering a ventricle depolarization and an retrograde atrial depolarization at a rapid rate, thus effecting reentry tachycardia.

FIG. 9 illustrates the condition of the display in a reentry tachyacardia arrythmia, after the circulating wave in the AV node has just passed the proximal function 73, going from the fast path 75 into the slow path 77. As shown in FIG. 9, the depolarization has begun to travel up the atrial link 34 to start an retrograde atrial beat, while depolarization in the ventricle is still travelling through the ventricle pathways 38 and 39 as a result of the depolarization wave, having previously passed through the distal junction 79. The lower part of the slow pathway 77 is shown still lit as being depolarized from the previous cycle of the wave through the slow path 77 and these cell areas are being repolarized ahead of the depolarization wave traveling down through the top of the slow pathway 77.

In the ladder diagram and ECG wave form in FIG. 9, two normal beats are shown followed by a PAC intervention by the operator to cause the ecoptic beat in the atrium at the time of the commencement of the T wave 55 in the second beat. This PAC intervention is represented in the ladder diagram by the small circle 109 in the atrial section 91 of the ladder diagram. Since the PAC intervention causes an ectopic beat in the atrium, the points 111 in the atrial section 91 representing the atrial depolarization are lit in the reverse direction from the bottom to the top.

In the AV nodal section 93 of the ladder diagram, following the PAC intervention, the conduction down the fast pathway is shown blocked immediately following the PAC intervention and conduction down the slow pathway is represented by the illumination of the points 113 in sequence. The conduction in the reverse direction through the fast pathway following the propagation of the wave through the slow pathway to the distal junction is represented by the lighting of the points 115 in sequence from the bottom to the top. The wave when reaching the proximal junction through the fast pathway then triggers an ectopic beat in the atrium represented by the lighting of the points 117 from bottom to top and the next propagation through the slow path is represented as before. The process and the display thus, cyclically continues. In this reentry tachycardia, the P wave would occur simultaneously with and is swamped by the T wave, so the P wave is not apparent in the ECG wave form.

Figure 10:
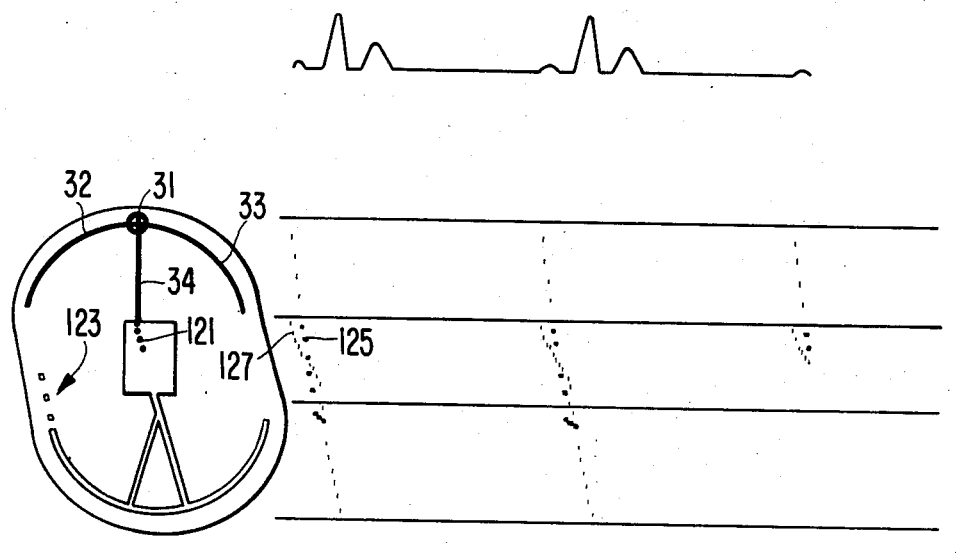

FIG. 10 illustrates the display for the heart with the Wolfe-Parkinson-White syndrome. In this display, the sinus node 31 has spontaneously depolarized and the depolarization has travelled through the atrial link 34 into the single pathway 121 in the AV node. The atrial paths 32 and 33 are depolarized and conduction has started through a Kent path, extending between the end of the atrial path 32 and the end of the ventricle path 38 and represented in FIG. 10 by a set of spaced points 123 between the end of the atrial pathway 32 and the end of the ventricular pathway. The points 123 of the Kent path are the background color of blue when the corresponding cell is polarized and are the lit color of yellow when the cell area represented by a given point is depolarized. In the display, the depolarization will continue simultaneously through the pathway 121 in the AV node and through the Kent path. The conduction through the Kent path will reach the ventricle first, giving rise to what is called a fusion beat and cause what is called a delta-wave slurr on the QRS pulse of the ECG. In the ladder diagram, the successive ignition of the points 127 represent transmission through the path 121 from top to bottom and the successive lighting of the points 125 from top to bottom represents conduction through the Kent path 123.

Figure 11:
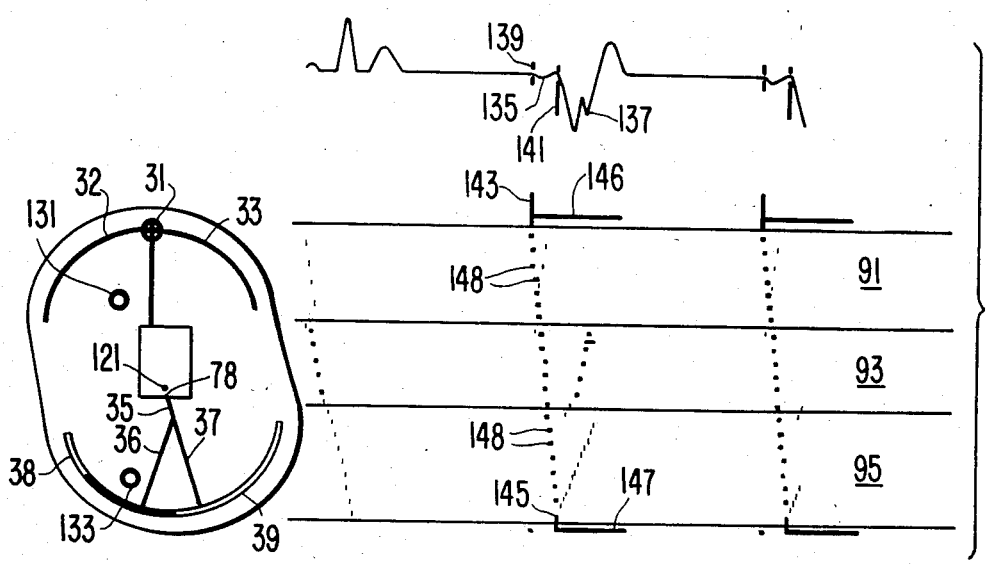

FIG. 11 illustrates the display of a simulated simple heart with a heart block at the proximal junction of the AV node and stimulated by a pacemaker. At the time that the atrium is stimulated by the pacemaker, the circle 131 is lit and at the time the ventricle is stimulated by the pacemaker the circle 133 is lit. The condition of the display, as shown in FIG. 11, shows all of the paths of the atrium lit, representing that the atrium is depolarized with the depolarization wave being terminated by a heart block at the proximal junction. The stimulation of the ventricle has caused the depolarization to travel through the right bundle branch 36, the His bundle 35, past the distal junction 79 and into the lower end of the single pathway 121 of the AV node. Conduction has also traveled from the junction of the His bundle and the right bundle branch, down through the left bundle branch 37. Depolarization has started up the right ventricle pathway 38, but has not yet commenced in the left ventricle pathway 39.

Because the depolarization caused by the pacemaker stimulation is ecoptic, the resulting P wave 135 and QRS wave 137 are inverted. The vertical bar 139 represents the atrial stimulation in the ECG and the vertical bar 141 represents the ventricle stimulation in the ECG. In the ladder diagram, the vertical bar 143 at the top of the atrial section 91, represents the atrial stimulation and the vertical bar 145 at the bottom of the ventricular section 95 represents the ventricle stimulation. The horizontal bar 146 is produced to represent the atrial pacer refractory time and the horizontal bar 147 represents the pacemaker ventricle refractory time.

As explained above, each time the program iterates through instruction sequence 65, it will respond to operator inputs to select another simulated heart, or to respond to operator inputs to intervene in the heart operation in the program.

If the operator wants to introduce an intervention into the heart simulation or change a parameter, he depresses a key of the keyboard 14 corresponding to the intervention that he wants to introduce. The routines for responding to operator entries are branched to from program step 170 and are found in steps 20,000 through 20,460.

If the operator depresses the equal key, then the next time the program iterates through the instruction sequence 65, it will display on the screen a list of the interventions and options that are available to the operator, each opposite the designation of the key to be depressed for the corresponding intervention.

If the operator depresses the A key, this means that the operator wants to introduce an atrial tachycardia flutter and the programmer will set a parameter, designated FU and normally set to 150, to a value 30 to cause flutter to be effected in the heart simulation.

If the operator depresses the C key, then in the next interation through instruction sequence 63, the program will set a flag so as to carry out the PAC intervention routine when the sinus clock T equals the value of the parameter PFR, which is initially set to 24. The PAC intervention starts an atrial ectopic beat and can be used to provoke a reentry tachycardia as explained above.

If the operator depresses the D key, then in instruction sequence 65, the program will prompt the operator to select a drug by pressing key 1 or key 2 with the key 1 selecting the drug Verapamil and the key 2 selecting Lidocaine. If the operator depresses the 1 key, the program branches to a routine to increase the slow path refractory time in the AV Node by increasing the parameter value SSS from its normal value of 20 to 40. The parameter SSS determines the refractory time in the slow path of the AV junction. If the operator depresses the 2 key then the program increases the ventricular refractory time to 400 milliseconds by changing the parameter value VR from its normal value of 25 to 40.

If the input key E is depressed, the operator is prompted to enter a new refractory time for the slow path in the AV Node and then sets parameters in accordance with the entered value.

If the operator depresses key F this means that the operator is specifying the injection of the drug Lidocaine and in response thereto, the program changes the ventrical refractory time to 400 milliseconds by changing the parameter VR to 40.

If the programmer depresses the key H, the operator is prompted to enter a spot location for a slow recovery pathological spot in the fast path of the AV junction and also to specify the refractory time for spot. In response to the entries made by the operator, the program sets the parameter, PFL, which controls the spot location, and the parameter PFR, which controls the spot refractory time, to the input values.

If the operator depresses the key I then the operator is prompted to select a sinus rate, that is the rate that the sinus node in the heart spontaneously depolarizes and in response to the entry by the operator, sets the parameter value I, which determines the sinus rate, to a corresponding value.

If the operator depresses the key J then the operator is specifying muscle noise as a pacemaker factor and the pacemaker atrial clock T1 is reset to 2, if T1 is greater PA+AV, to start a new atrial pacer cycle without an atrial beat. PA+AV determines the pacer atrial refractory period.

If the input key L is depressed this means that the operator wants to introduce a predetermined set of overdrive stimuli. In response to this key depression, if the heart selected is not the Wolfe-Parkinson-White Syndrome heart, the program will set parameters R to 55, MM to 1, OD to 1, J to 5 and IR to 5 to provide for 5 overdrive stimuli. The parameter R specifies the overdrive stimuli interval. By setting the parameter MM to 1, the atrium is designated for the stimuli. OD is the overdrive clock and by setting it to 1, it is triggered to start its timing cycle. J is the number of overdrive stimuli called for, and IR is the amount that the overdrive interval is to be decremented on each cycle.

If the operator depresses the key M, the operator is specifying that a spontaneous depolarization is to occur in the His bundle at the distal junction. If the His pathway is already depolarized, nothing happens, but if the pathway is not depolarized then the program draws a small circle in the ladder diagram to indicate that a spontaneous depolarization has occurred and then sets the parameter ER value to 0.5. ER determines the rate that the polarization is propagated in the retrograde direction through the slow path and is initially set to 1. In addition depolarization is started in the His bundle, and in the reverse direction through the paths in the AV node if these paths are not refractory, by triggering the appropriate clocks.

If the operator wants to cause an early ventricular spontaneous depolarization, he depresses the N key. The program in response to the N key being depressed will cause a ventricular depolarization in the simulated heart 20 milliseconds after the end of the ventricular refractory period. To initiate the beat, the ventricular clock Q is set to 1, the V is set to 1 to indicate that the depolarization in the ventricle is ectopic.

If the operator depresses the O key, this means that the operator has selected the overdrive option. In response to this key actuation, the program prompts the operator to select the atrium or the ventricle. The program triggers the overdrive clock OD by setting it to 1 at the start of the atrial interval when T is equal to 1 if the chamber selected is the atrium. If the chamber selected is the ventricle, then the overdrive clock OD is set to 1 at the start of the ventricle activity, when the ventricle clock Q equals 1.

If the operator depresses the P key, this means that the operator wants to select a pacemaker or ventricular parasystole condition and the operator is informed on the screen that his choices are (1) experimental, (2)DDD, (3) DDX, (4) DVI/C, (5) DVI/NC, and (6) ventricular parasystole to prompt the operator to choose one of the options. Then in response to the option chosen, the program sets the value of the Z to the number of the option selected by the operator, and also triggers the atrial pacer clock T1 by setting it to 1 and the ventricular pacer clock QP to equal the value of the ventricular clock Q. The value of I is set to 120 to set 1.2 seconds between spontaneous sinus node depolarization and the parameter B is set to 1 to indicate a heart block at the proximal junction of the AV node, unless the pacemaker option selected was the number 6, for ventricular parasystole. If the ventricular parasystole option is selected, B is set to 0 to indicate no block and the value of I is set to 75 to designate a period of 750 milliseconds between spontaneous depolarizations by the sinus node.

If the operator depresses the key Q, this means that the operator wants to select a value for the atrial refractory time and the operator is prompted to select a value in the range between 50 and 400 milliseconds. The value of AR, which determines the atrial refractory period, is set to 1/10 of the number of milliseconds selected by the operator.

If the operator depresses the key R, this means that the operator wants to select the refractory time for the fast path in the AV node. The operator is prompted to select a value in the range of 150 to 400 milliseconds and in response to the entry by the operator, of a value in this range, the program sets the value FR to 1/10 of the value entered by the operator to designate the selected refractory time.

If the operator depresses the key S, this means that the operator wants to specify a heart condition of ventricular tachycardia, meaning that the ventricle will spontaneously depolarize periodically at short time intervals. In response to the depression of the S key, the program sets the parameter VE to 31 to designate a spontaneous depolarization interval for the ventricle of 310 milliseconds.

If the operator depresses the key T, this means that he wants to select a refractory time for the His pathway. In response to the depression of the key T, the program will prompt the operator to select a His refractory time of between 50 and 400 milliseconds and then will set the value of HR, which designates the His refractory time, to 1/10 of the value entered by the operator.

If the operator depresses the key U, then this means that the operator wants to cause a heart block. In response to the key U, the operator is prompted to depress keys 1-6 to indicate what type of heart block is desired. The key 1 means a block in the proximal AV junction. The key 2 means a block in the His-purkinje system. The key 3 means that the block selected is a block in the right bundle branch. The key 4 means the block selected is in the left bundle branch. The key 5 means that the Wenckebach Syndrome is selected, which is a normal delay in the AV node followed by increasingly longer delays and finally reaching a point at which a complete block occurs in the AV node and this is followed by a spontaneous ventricular depolarization. The key 6 means that a second degree heart block is selected. In response to the operator depressing one of the keys 1-6, the value of B is set to the value equaling the number of the key depressed. If the key 2 is depressed to select the block in the His-purkinje System, then the parameter VR is set to 35 to designate a ventricle refractory time of 350 milliseconds. If the 5 key is depressed to select a Wenckebach Syndrome, then the interval for the sinus node is set to 0.5 seconds by setting I=50. If the key 6 is depressed to select the second degree heart block, then the spot refractory time is set to 400 milliseconds by setting the value PFR to 40, the slow path refractory interval is set to 400 milliseconds by setting SR to 40, and the sinus node interval is set to 390 milliseconds by setting I to 39.

If the operator depresses the key W, this means that the operator wants to set the ventricular refractory time, the time it takes the cells in the ventricle pathways to be repolarized after being depolarized. In response to the depression of the key W, the program prompts the operator to select a ventricle refractory interval of between 170 and 400 milliseconds. In response to entry of a value in this range, the program sets the value VR to 1/10 of the entred value.

If the operator depresses the key Y, this means he wants to select a conduction or depolarization wave propagation velocity in the fast path of the AV node. The operator is prompted to select a value between 20% and 400% of the normal conduction velocity. The value of the parameter SF, which controls the conduction velocity is then set to a value corresponding to the value selected by taking the entered value and dividing it by 100. Thus the value of SF will be set to a value between 0.2 and 4.

If the operator depresses the 1 key, the program will freeze the screen. If the operator wants to have the heart operation take place at a slow speed, then he depresses the 2 key. If the operator wants the heart operation to take place at a medium speed, then he presses the 3 key. The normal operating speed will be the fast speed and to return to the fast speed, the operator depresses the 4 key.

If the operator depresses the key 6, then this means that he wants to specify the maximum trigger rate of pacer stimuli available, also known as MAXTRACK. In response to depressing the key 6, the operator is prompted to enter a value in the range of 90 to 200. The value of the parameter MAXTRACK is then set to the interger value of 6,000 divided by the entered value. The parameter MAXTRACK is made use of in some of the pacemaker routines to provide a maximum rate that the pacemaker will trigger the ventricle.

If the operator depresses the key 7, this means he wants to specify the delay period for the pacer between the atrium and ventricular stimuli. In response to depressing the key 7, the program prompts the operator to enter a value for the delay of between 20 and 400 milliseconds. In response to the entered value in this range, the program sets the parameter AV to 1/10 of the entered value.

If the operator depresses the key 8, he is prompted to enter a pacemaker atrial stimulation rate in the range of 60 to 150 per minute. In response to the entry of a value in this range, the program then sets the value of IP to 6,000 divided by the entered value. The value IP×10 then determines the pacer interval in milliseconds.

If the operator wants to set a pacer atrial refractory time, he depresses the key 9. The operator is then prompted to enter a pacer refractory time in the range of 50 to 500 milliseconds. The value PA is then set to 1/10 of the entered value.

The actuation of the key 0 means that the operator wants to select a pacer ventricle refractory time and in response to depression of this key, the operator is prompted to enter a value in the range of 100 to 400 milliseconds. The program then sets the PV to the 1/10 of the entered value.

If the operator wants to restart the program and reset all of the parameter values back to their nominal values, then he depresses the apostrophe key and the program will return to instruction sequence 61, as shown in FIG. 3 and start the program over.

FIGS. 12a-12f are a flow chart illustrating the program instruction set 69, for the heart with the dual pathways in the AV node, in more detail. On these figures the blocks designating instruction steps or sequences have been designated by the same reference number as the step or the first step of the corresponding sequence in the listing of the program in the appendix.

Figure 12A:
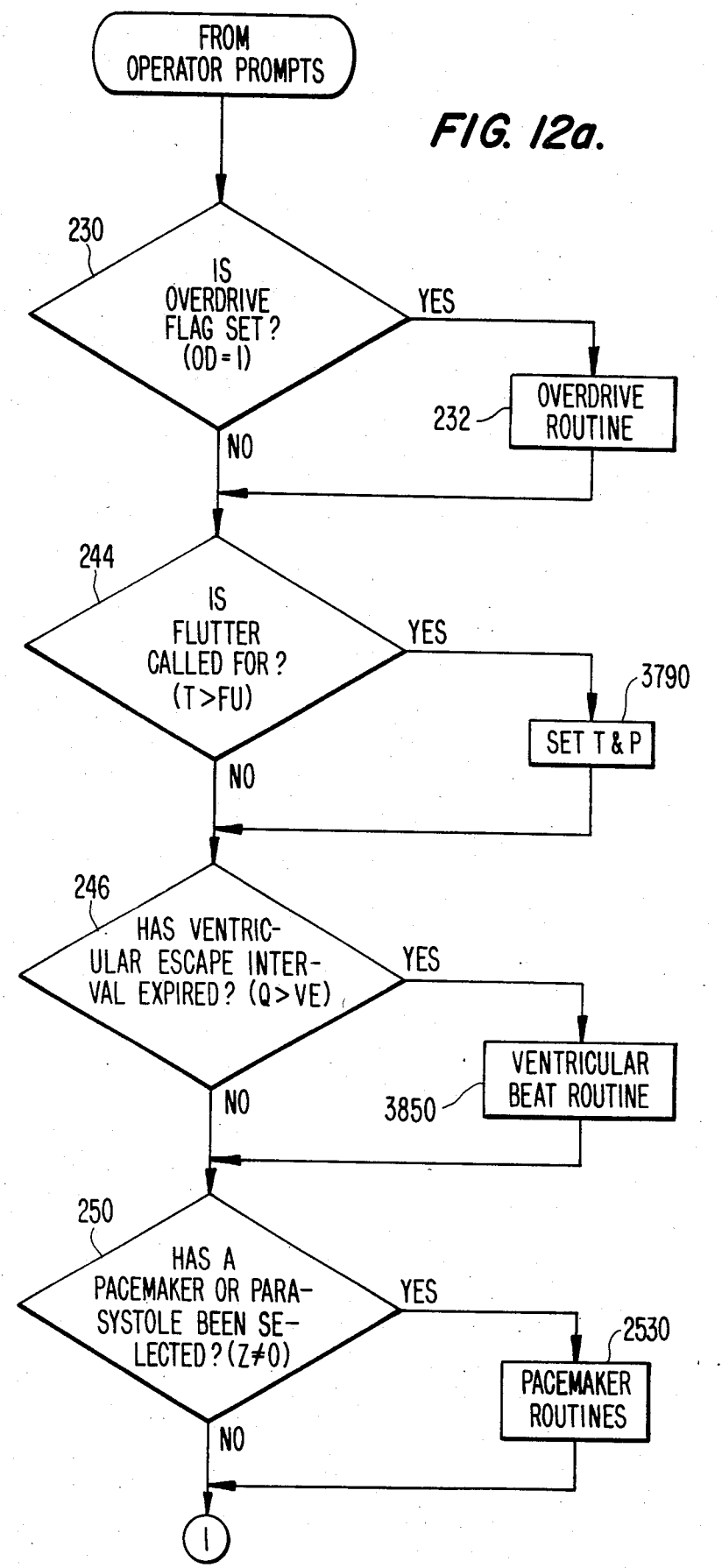
Figure 12C:
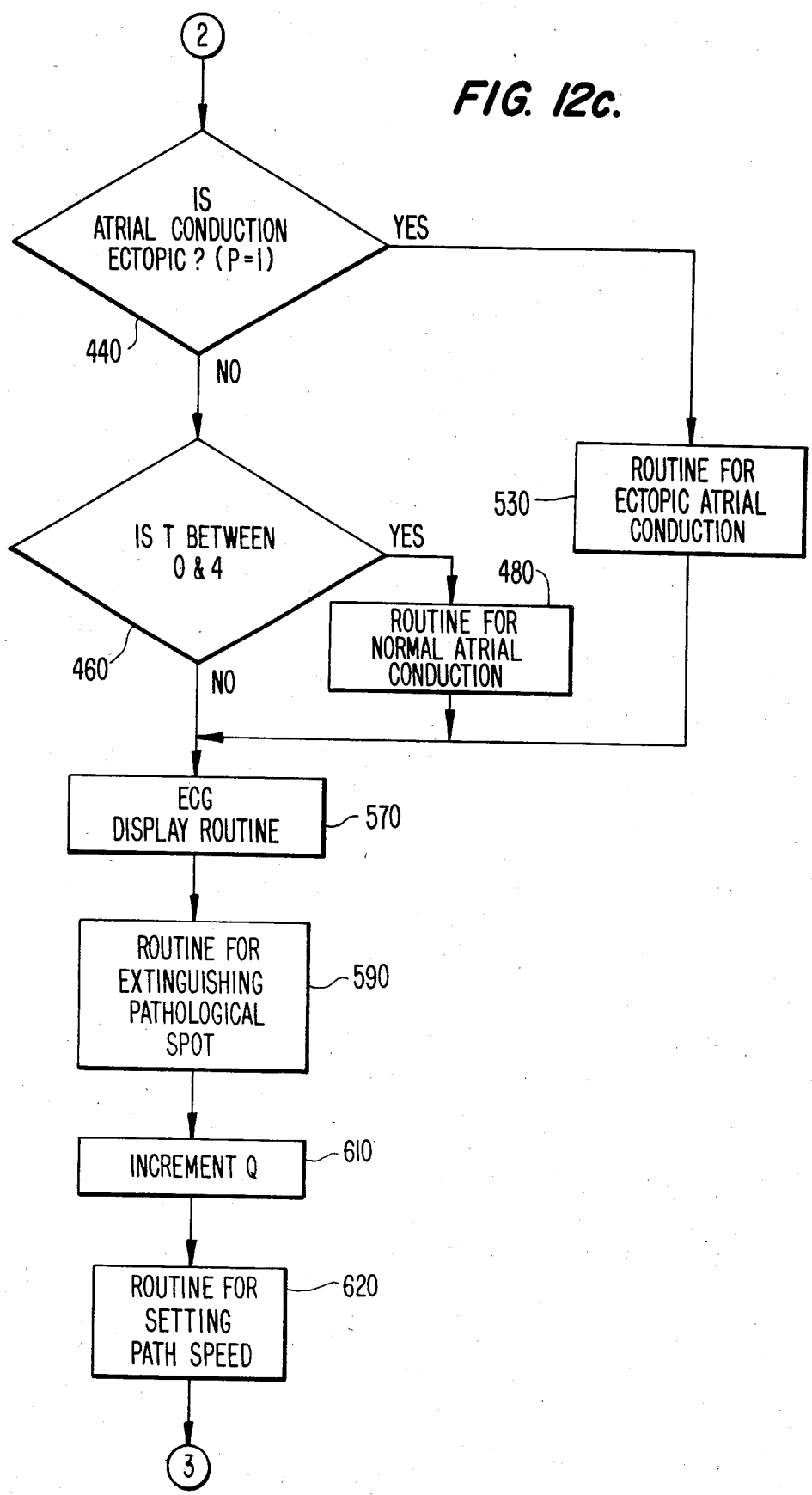
Figure 12D:
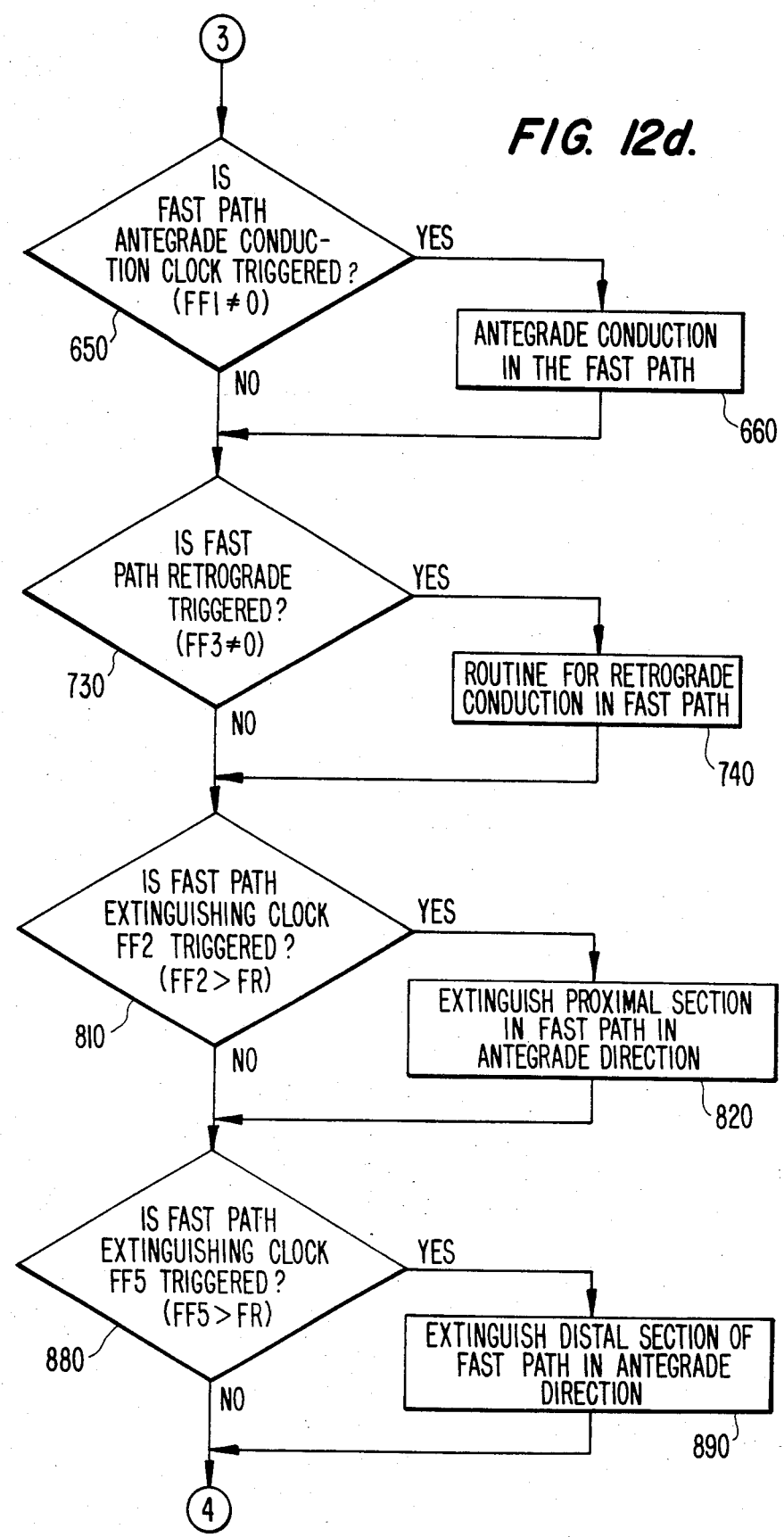
Figure 12E:
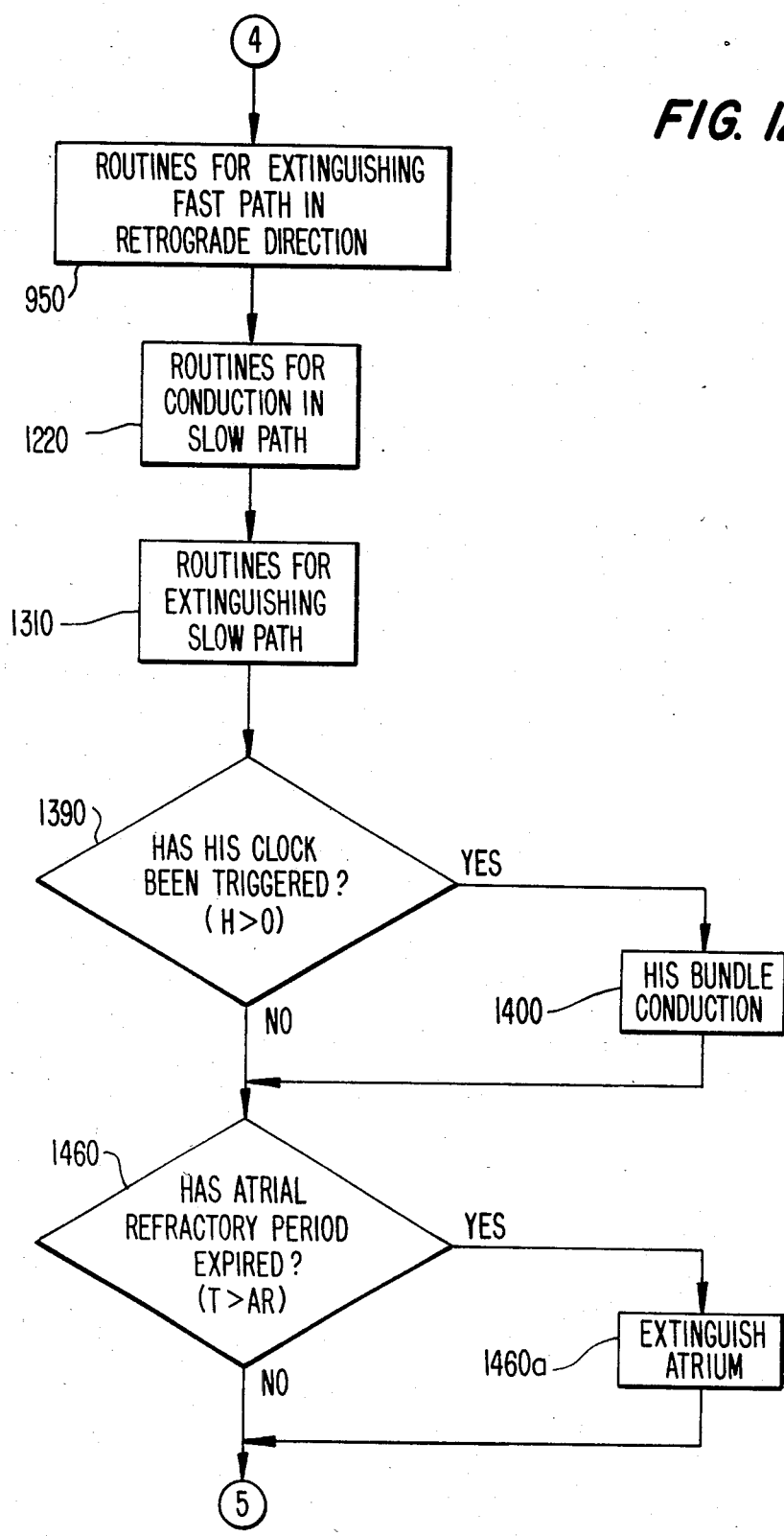
Figure 12F:
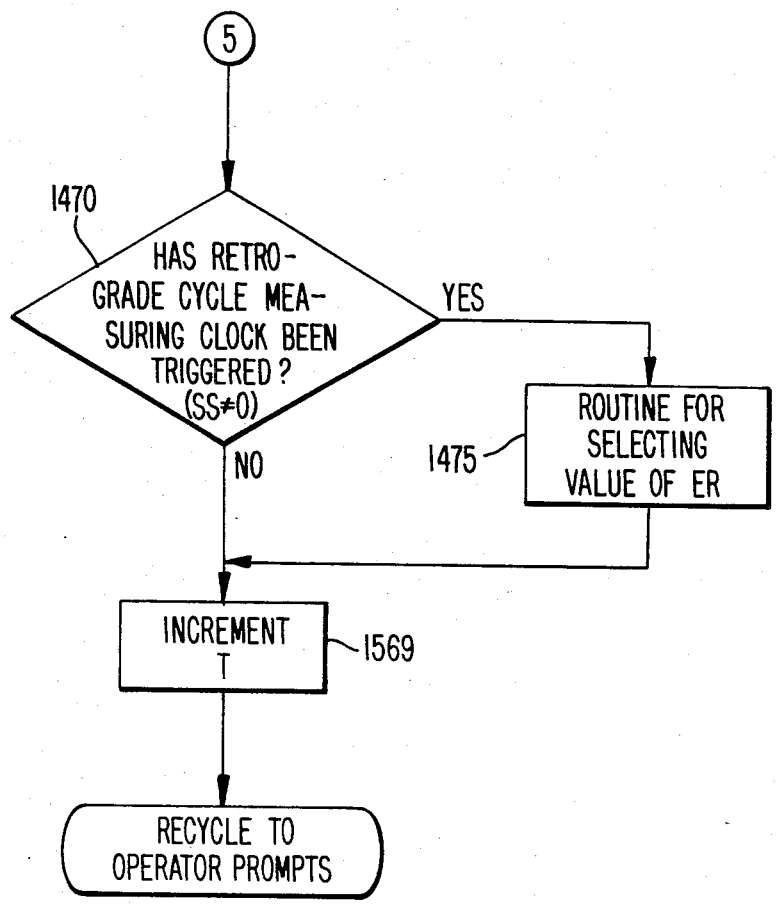

As shown in FIG. 12a, the program, after exiting from instruction sequence 65, in which the program responded to operator interventions, as explained above, enters a decision step 230, to determine whether or not the overdrive clock, OD, has been triggered. If the overdrive clock has been triggered, it will be at a value greater than zero and the program will proceed into the overdrive routine 232, in which it is determined whether the overdrive clock has reached the value of the overdrive stimuli interval, which is determined by the parameter R. If not the overdrive clock is incremented and the program exists from the overdrive routine 232. On the other hand, if the overdrive clock has reached the overdrive stimuli interval, then the program will first determine if a stimuli counter U, which counts the number of overdrive stimuli executed by the routine has reached the total number of overdrive stimuli to be carried out as set by the operator and as determined by the parameter J. If counter U has reached the value J, then the overdrive clock is set to zero and the program exits from the overdrive routine. If the stimuli counter U has not reached the value J, the program will reset the overdrive clock to 1, increment the stimuli counter U, and decrease the value of R by the overdrive interval decrement value as determined by the parameter IR. If the operator has selected the atrium for the overdrive, then if the atrium pathways are not refractory, the program stimulates an atrial beat by setting T=1 and displaying a representation of this artificial stimulation in the heart 15, on the ECG, and on the ladder diagram. An artificial stimulation is represented in the heart by the drawing of a circle like the circle 131 shown in FIG. 11, in the ECG by drawing a line like the line 139 shown in FIG. 11, and in the ladder diagram by drawing a line like the line 143 above the atrial section 91, as shown in FIG. 11. In addition P is set to 1 to indicate that the atrial beat is ectopic and E is set to 0.5 to provide for half speed conduction in the slow path. If the operator has selected the ventricle, then if the ventricle is not refractory as determined by Q being less than VR, the program stimulates a ventricle beat by setting the ventricle clock Q to 1 and also sets the parameter V=1 to indicate that the ventricle beat is ectopic. The artificial stimulation of the ventricle by the overdrive is displayed in the heart, the ladder diagram, and the ECG. The representation in the anatomy is a circle like the circle 133 in FIG. 11. The display in the ECG is shown by drawing a vertical line like the line 141, as shown in FIG. 11 and the display in the ladder diagram is shown by drawing a line like the line 145 at the bottom of the ventricular section 95 of the ladder diagram, as shown in FIG. 11. In this manner, the atrium or ventricle is stimulated each time the overdrive clock reaches the value of the overdrive interval, which is progressively decreased by the overdrive increment IR until the number of stimulations, selected by the operator have been carried out.

After exiting the overdrive routine 232, or exiting the decision step 230 when the overdrive clock OD has not been triggered, the program enters decision step 244, in which it is determined whether or not a flutter has been called for as determined by the parameter FU. If no flutter interval has been called for, the flutter parameter FU will be set to a high value above the maximum sinus rate. If a flutter has been called for, the value FU is set to 30. When the value of clock T reaches 30 and FU has been set to 30, then the program will branch from decision sequence 244 into instruction sequence 3790. In instruction sequence 3790, if the atrium is not refractory as determined by T being greater than the parameter AR, the parameter E is set to 0.5 so as to slow the rate of depolarization propagation through the slow path, the clock T is set to 1 to trigger an atrial beat, and the parameter P is set to 1 to include that the beat is ectopic. Thereupon the program exits the routine 3790. If the atrium is refractory, the program exits from the routine 3790, without stimulating a beat.

Upon exiting from the routine 3790 or exiting the decision step 244 if T is not greater than FU, the program enters decision step 246, in which the program determines whether or not the ventricular escape interval has expired. This is determined by comparing the value of the ventricular clock Q with the parameter VE, which sets the ventricular escape interval. If Q is greater than VE, the ventricular escape interval has expired and the program branches into subroutine 3850. If this subroutine, if the ventricular refractory period has expired, as would normally be the case when the ventricular escape interval has expired, a ventricular beat is triggered by resetting the ventricular clock Q to 1, and the parameter V is set to 1 to indicate that the ventricular beat is ectopic.

After exiting from the subroutine 3850 or exiting from the decision step 246, when the ventricual escape interval has not expired, the program enters decision step 250. In decision sequence 250, the program determines whether or not a pacemaker has been selected and if so, it branches to subroutines 2500, to carry out a subroutine depending the pacemaker option selected.

After exiting from the pacemaker routines 2500 or from the decision step 250 if no pacemaker has been selected, the program enters decision step 270, in which it determines whether it is time to start the T wave in the ECG display. When the ventricular clock Q reaches a value of 13, it is time to start the T wave and the program will branch from the decision step 270 to the subroutine 1530, in which the program triggers the T wave clock QT by setting it to 1. Upon exiting from routine 1530 or from exiting from the decision step 270 if Q does not equal 13, the program enters decision sequence 280 in which the program determines whether or not the T wave clock QT has been triggered. If the clock QT does not equal 0, this means that it has been triggered and the program enters the T wave routine 282. In this routine the variable K1 is set to a value determined in accordance with the value of the clock QT and the ventricular refractory period VR. The value K1 is used in a later step in the program in determining the ventricular contribution to the deflection in the ECG display when it is generated. Following the setting of the value of K1, the T wave clock QT is incremented. The program then exits the routine 282 and enters the decision step 282a, in which the program determines whether the value of the T wave clock QT has exceeded the value of the ventricular refractory period minus 13 (VR−13). If so, this means that the T wave has ended and the program enters routine 282b, in which the value of K1 is set back to 0, the value of the parameter V, which determines whether or not a ventricular beat is ectopic or normal is set to 0 and the T wave clock QT is reset to 0. In addition, in routine 282b the right and left bundle branches 36 and 37 and the ventrical pathways 38 and 39 are extinguished, that is returned to the background blue color to represent that these pathways have been repolarized. In addition, any display of a small circle in the ventrical to indicate artificial stimulation of the vertical is also extinguished.

Figure 13:
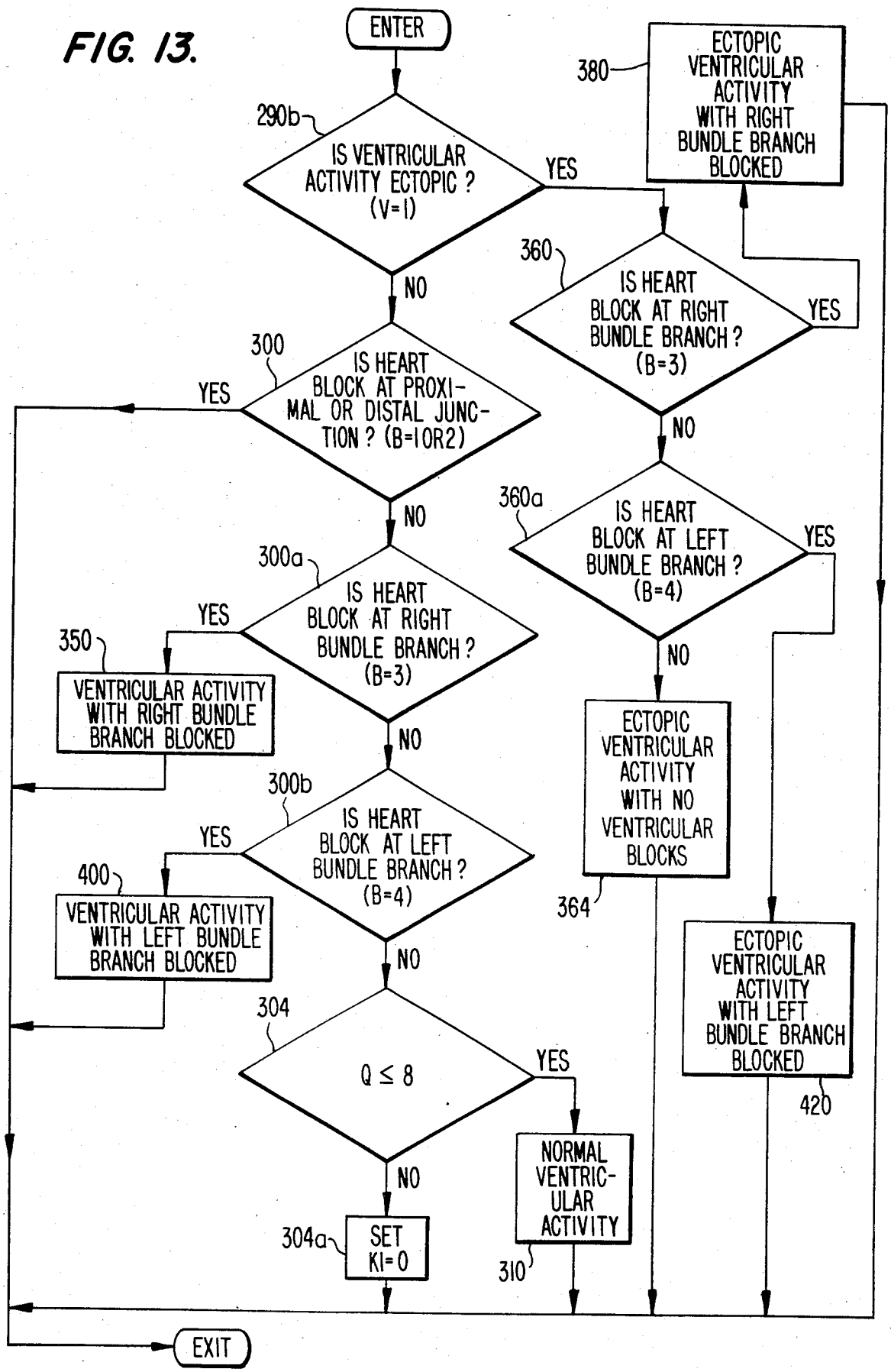
FIG. 13 is a flow chart of a subroutine of the program illustrated in FIGS. 12a-12f.

After the program exits from the 282b or from the step 282a if the ventricular clock QT does not exceed VR−13, or from the decision step 280 if the T wave clock has not been triggered, the program enters decision step 290. In this decision step the program determines whether any ventricular activity is called for by the ventricular clock Q. If Q is greater than 13, the program advances to decision step 440. If Q is less than or equal to 13, the program branches to the ventricular routine 290a, which is illustrated in more detail in the flow chart of FIG. 13. As shown in FIG. 13, the program first enters decision step 290b, in which parameter V is examined to determine if the ventricular activity is ectopic. If the ventricular activity is normal, and heart blocks B=1-4 have not been selected, the program proceeds through decision step 300, 300a, and 300b, into decision step 304, in which the clock Q is again examined to see if it is less than or equal to 8. If in decision step 304, the ventricular clock Q is less than or equal to 8, this means that normal ventricular activity is taking place and the program branches to routine 310 to carry out normal ventricular activity. In this routine, the value of K1 is set to a value depending upon Q in accordance with normal ventricular activity and a segment of each of the left and right ventricular pathways 38 and 39 is lit depending on the value of Q so that as Q increases in successive iterations through the routine, the lighting of the pathways proceeds away from the junctions with the bundle branches 36 and 37. In addition a point is lit in the ventricular section 95 of the ladder in accordance with the value of Q so that as Q increases points will be lit proceeding from top to bottom to indicate normal ventricular activity. If in decision step 304, Q is greater than 8, the program proceeds into instruction step 304a and sets K1 equal to 0. Following instruction sequence 310 or instruction step 304a, the program exits from the ventricular routine.

If the ventrical activity is not ectopic and a heart block number 1, for a heart block at the AV junction, or number 2, for a heart block in the His bundle, has been selected, this means that no ventrical activity will take place and the program will exit from the ventricular activity routine at decision sequence 300. If the ventricular activity is not ectopic and the heart block number 3 has been selected, meaning a block in the right bundle branch, then from decision sequence 300a, the program will branch into instruction sequence 350 to carry out the routine for the ventricular activity with the right bundle branch blocked. In this routine the program will light a segment of the left and right ventricular pathways 38 and 39 depending on the value of Q with the lighting proceeding progressively away from the junction of the left pathway 38 with the left bundle branch 36. In addition, a point in the ventricular section 95 will be lit as determined by Q, the value of K1 is set to a value depending upon Q, and the ECG amplification factor TA is changed from its normal value of 5 to a value of 3. The value of TA is used in conjunction with the value of K1 to determine the ECG deflection when it is generated in a later step in the program. Following routine 350, the program exits from the ventricular activity routine. If the ventricular activity is not ectopic and the block selected is number 4, to designate a block in the left bundle branch, then in decision sequence 300b, the program branches to routine 400 to carry out the routine for the activity with the left bundle branch blocked, which is analogous to the routine 350 for the right bundle branch being blocked.

If the ventricle activity is ectopic, then the value V will be equal to 1 and from decision step 290b, the program will branch to decision step 360. Here if the heart block number 3 has been selected, the program will branch to the routine 380 for ectopic ventricle activity with the right bundle branch blocked. In this routine segments of the right pathway 38, the left bundle branch 36 and segments of the left pathway 39 will be lit in that order in successive iterations through the routine with increasing values of Q. The right bundle branch is left unlit. After lighting the left bundle branch, if the H clock, the clock for conduction in the His bundle, is untriggered (H=0), the routine 380 triggers it by setting it to 1 to initiate conduction in the His bundle. In the routine 380 the parameter HT is set to 1 to indicate that the His bundle conduction is retrograde. Also, a point corresponding the value of Q in the ventricle section 95 will be lit with the lighting proceeding from bottom to top on successive iterations through the routine for ectopic ventricle activity. The value of K1 will be set to a value depending upon Q and corresponding to this type of ventricle activity and the amplification factor TA will be set to −7 for the ECG display.

If the ventricle activity is ectopic and the block selected is block number 4, then the program proceeds through decision sequence 360 into decision sequence 360a and branches into routine 420 for ectopic ventrical activity with the left bundle branch blocked. This routine is analogous to the routine 380 with the right bundle branch blocked. However, in this routine, the left bundle branch is not lit since it is blocked and the right bundle branch 37 is lit.

If the ventricular activity is ectopic, and neither block number 3 or number 4 is selected, the program then proceeds through decision sequence 360a into routine 364 for ectopic ventrical activity with no ventricular blocks. In this routine the value of K1 is set in accordance with the value of Q and in accordance with this type of ventricular activity, the amplification factor TA is set to 7 and points in the ladder section 95 are lit in successive iterations in the reverse direction with increasing values of Q. The lower part of the right ventricular pathway, the right bundle branch 37, the left bundle branch 36, and the lower part of the left ventricular pathway 38 are lit in that order in successive iterations as the value of Q increases. Then the lightning progresses up the pathways 38 and 39 as the value of Q increases further. After completing routines 364, 420 or 380, the program exists from the ventricular activity routine.

After exiting from the ventricular routine or from decision step 290 if Q is greater than 13, the program enters the decision step 440, which is the start of the program for the atrial activity. In decision step 440, the program determines if the atrial activity is ectopic, in which case the parameter P will have been set to 1. If P is not equal to 1, meaning that the atrial activity is not ectopic, the program proceeds into decision step 460, in which the value of the clock T is examined to see if it is in the range from 1 to 4 to determine if atrial activity is taking place. If the value of T is in this range, atrial activity is taking place and the program proceeds into the routine 480. In this routine the program lights the sinus node 31 when T=1 and segments of the pathways 32, 33 are lit in accordance with the value of T, proceeding progressively from the sinus node down the pathways 32 and 33 as T increases on successive iterations through the routine. When T=2 the atrial link 34 is lit. Also in routine 480 the value of the variable K is set to a value varying with T corresponding to normal atrial activity. The value of K provides the atrial component of the verticle deflection of the ECG wave when it is generated. Thus, K will determine the amplitude of the P wave when it is generated in the ECG. In addition, a point in the atrial section 91 of the ladder display will be lit in accordance with the value of T. When T equals 3 in the routine 480, the program first checks to see whether B=1, representing a block at the proximal junction of the AV node. If so, the program exits from the routine 480 without triggering the clocks for the fast and slow pathways 75 and 77. If B does not equal 1, the program then tests to see if the entrances to the fast and slow pathways 75 and 77 are lit. If the entrance to the slow pathway 77 is not lit, then the program selects an untriggered one of the clocks S5 or S8, which are the two clocks for extinguishing the slow pathway in the antegrade direction and which are untriggered if they equal −SR, SR being the slow path refractory time. The program then triggers the selected clock by increasing it from −SR. At the same time, the clock S1 is triggered if the clock S5 is triggered and the clock S2 is triggered if the clock S8 is triggered. The clock S1 and S2 control the propagation of the depolarization conduction waves through the slow path. Two clocks are needed for both depolarizing and repolarizing so that two depolarizing waves and two repolarization waves can be traveling simultaneously through the path.

If the entrance to the fast path is not lit, the program triggers the clock for conduction through the fast path in the antegrade direction, FF1, by setting it to the value SF. In addition, if a pathological spot (slow recovering spot) has been selected to have location at the entrance of the fast path 77, then the spot clock PF1 is triggered by setting it to 1.

If in the decision sequence 440, it is determined that P=1, to indicate that the atrial activity is ectopic, the program branches to routine 530. In this routine the lighting of the atrial pathways travels progressively up the atrial link 34 and then down the atrial pathways 32 and 33 as T increases in successive iterations. At the time T=2, the entrances to the slow and fast pathways are examined to see if they are lit and if not, the clocks for the slow and fast pathways are triggered in the same manner as described above with respect to normal atrial beat. The value of K is set to a minus value, depending upon the value of T, so as to provide a negative magnitude for the P wave when the ECG is generated.

After completing routine 480 or 530 or exiting from decision step 460 if T is greater than 4, the program enters instruction sequence 570, in which the ECG wave form is displayed in accordance with the previously set values of K and K1. The ECG wave form is generated by determining the position of the current point on the wave form and then drawing a line from the previous point from the current point.

Following instruction sequence 570, the program enters into instruction sequence 590, in which the routine for carrying out the extinguishing of a pathological or slow recovery spot is carried out. In this routine, the spot clock PF1 and the spot clock PF3 are examined and if these clocks are equal to 0, meaning that these clocks have not been triggered, then the program exits from the routine. The clock PF1 is the clock controlling the extinguishing of the spot when the spot is lit by an antegrade wave. The clock PF3 is the clock for controlling the extinguishing of the spot when the spot has been lit by a retrograde wave. If the spot clock PF1 is greater than the refractory time PFR, then the spot is extinguished and the spot clock PF1 is set to 0. If the spot clock PF1 has been triggered, but it is not yet greater than the spot refractory time PFR, then the spot clock PF1 is incremented. If the spot clock PF3 has been triggered and it exceeds the spot refractory time PFR, then the spot is extinguished and the spot clock PF3 is set to 0. If the clock PF3 has been triggered, but does not exceed PFR, then the clock PF3 is incremented.

After exiting from the routine 590 for extinguishing the spot, the program enters instruction step 610, in which the ventricular clock Q is incremented. Next, the program enters instruction 620 sequence for resetting the parameters E and ER. In this sequence the parameter E will be set to 1 if T=MI. As explained above, E is a parameter that controls the speed of antegrade conduction through the slow path 77. If E is equal to 1, then the speed of conduction through the slow path is at a normal speed and if E is set to 0.5, then the conduction through the slow path is at half normal speed. Whenever the interval between atrial beats equals or exceeds the parameter MI, then the speed of conduction through the slow path is set to the normal speed by setting E=1. MI is normally set to 50, representing 500 milliseconds. In addition, if the clock SS=MI, then the parameter ER is set to 1. As explained above, ER controls the conduction rate in the retrograde direction through the slow path and when it is set to 1, it will control this conduction to be at a normal rate. Under certain conditions, it is set to 0.5 to make the rate of conduction in the retrograde direction through the slow path at ½ the normal rate. SS is a clock that measures the retrograde cycle time and is triggered when a depolarization wave enters the distal end of the slow path 77.

When the retrograde cycle time equals the value set by the parameter MI, the parameter ER is set to 1 and the clock SS is reset to 0.

Following routine 620, the program next enters decision step 650, in which it is determined whether or not the antegrade clock for the fast path FF1 has been triggered. If FF1 does not equal 0, this means that it has been triggered and the program branches to instruction sequence 660 to carry out the routine for antegrade conduction in the fast path 75. In this routine, the fast path clock FF1 is incremented by the fast path conduction rate SF on each iteration through the routine. The parameter SF is normally set to 1, but it may be set in the range from 0.2 to 4. Each time the value of FF1 has increased by at least one, a point is lit in the fast path corresponding to the value of FF1. In addition, a point in the AV nodal section 93 of the ladder display is lit in accordance with the value of FF1. Also the next point to be lit in the fast path is tested to see if it is already lit. As long as the next point in the fast path is not found to be lit, the conduction in the fast path proceeds by lighting successive points in the fast path and the section 93 of the ladder display as the value of FF1 increases on each iteration of the program through the routine 660. When conduction reaches the end of the path, the value of FF1 will have increased to six, whereupon the conduction in the fast path ends by resetting the clock FF1 to 0. When FF1 reaches a value of 3, the clock FF5 is triggered by setting it to a value greater than −FR. The clock FF5 is used later in the program to extinguish lit points in the fast path. In addition, when FF1 reaches a value two less than the value of PFL, which determines the position of a pathological spot in the fast path, then the clock PF1 for extinguishing this spot is triggered by setting it equal to 1 and the clock FF2 is triggered by making it more positive than −FR. FF2 is also a clock for extinguishing points in the fast path.

If it is determined that the next spot to be lit in the fast path is already lit, FF1 is set to 0 to end conduction in the fast path at this point and the program causes a short horizontal line to be drawn in the ladder section 93 at a position corresponding to the value of FF1 to indicate the block in the fast path. In addition, if when the next point has been found to be lit and FF1 has not reached a value 2 less than the spot number, then the clock FF2 is triggered and if FF1 has reached a value 1 less than the spot number, then the clock FF5 is triggered.

When conduction reaches the end of the fast path represented by the clock FF1 reaching a value of 6, the entrance to the slow path at the distal junction of the AV node is tested to see if it is lit. If the entrance to the slow path is not lit, then conduction in the slow path at the distal end is initiated by triggering the clock S6 and S3, or S9 and S4, if the clock S6 is already triggered. The clock S6 or S9 is triggered by increasing it to a value greater than −SR. The clock S3 or S4 is triggered by changing it from 0 to equal ER. The clocks S6 and S9 control the retrograde extinguishing of the slow path and the clocks S3 and S4 control the retrograde lighting of the slow path. In addition, the clock SS is triggered by setting it equal to 1. The clock SS serves to measure the cycle length for retrograde conduction and is used to set the value of ER, which controls the retrograde conduction speed in the slow path.

In addition, upon the conduction in the fast path, reaching the end thereof as indicated by the clock FF1 reaching the value of 6, if there is no block between the AV distal node 79 and the His bundle 35, the program tests to see if the top segment of the His bundle is refractory. If the clock H=0, the top segment is not refractory and antegrade conduction in the His bundle is initiated by triggering the His bundle clock H, that is setting it to 1, and the parameter HT is set to 0 to indicate that the conduction in the His bundle is antegrade. If at the time of the test of the His bundle, HT=1 and H is 1 or 2, the top segment is also not refractory, but a collision will occur in the His bundle. Under these conditions, the program lights the top segment of the His bundle, displays an indication of the collision in the ladder diagram, and sets H=3. If H is greater than 2, the top segment is refractory and the program takes no further action with regard to the His bundle in the routine 660.

After exiting from the routine 660, or from the step 650 if the clock FF1 is not triggered, the program carries out decision step 730, in which it determines whether or not the clock FF3 is triggered, the clock FF3 being the clock for retrograde conduction in the fast path. If FF3 is not 0, it has been triggered and the program enters routine 740, in which the program carries out a routine for conduction in the retrograde direction through the fast path, in essentially the same manner as the routine 660, but operating on different clocks. In this routine the clock FF6 is triggered when FF3 reaches the value of 5, the clocks FF4 and PF3 are triggered when 6−FF3 has decreased to a value equal to or greater than the number of the pathological spot. The clocks FF4 and FF6 both control extinction of points of the fast path in a later routine in the program when these clocks are triggered. The clock FF4 and FF6 are untriggered when they are equal −FR, which is normally set to 20, and are triggered by making them more positive than −FR. In this routine, if and when the conduction reaches the end of the path, it will be at the proximal junction of the AV node. When the conduction reaches the proximal junction, as determined by FF3 reaching the value of 6, the program then tests the entrance of the slow path at the proximal junction to see if it is lit. If it is not lit, the program triggers the clock S5 and the clock S1 if the clock S5 is not already triggered or otherwise triggers the clock S8 and S2 in the manner described above with reference to routine 480. In addition, the atrium is checked to see if it is refractory or not. If T is greater than AR, this means that the atrium is not refractory and in response to this condition, an ectopic atrial beat will be triggered by setting T=1 and setting P=1. In addition, if the value of T at this time is less than the parameter MI, then the parameter E controlling the antegrade conduction rate in the slow path is set to 0.5.

After exiting from the routine 740, or from the step 730 if the clock FF3 is not triggered, the program enters step 810, in which it is determined whether the clock FF2, has been triggered. FF2 controls the extinguishing of points in the fast path from the proximal junction to the location of a pathological spot. If FF2 is greater than −FR, then this clock has been triggered and the program proceeds into routine 820, in which the clock FF2 is incremented by the parameter SSF on each iteration through the routine. The parameter SSF controls the rate that the fast path is extinguished and it is normally set to 1. Each time FF2 increases by an integer, the program then extinguishes a point in the fast path in accordance with the value of FF2. When the value of FF2 reaches a value corresponding to the pathological spot location PFR, this means that the extinguishing action in response to FF2 is completed and the clock FF2 is reset to its untriggered value. Alternatively when the next spot to be extinguished is aready extinguished, the extinguishing action in response to PFL is also terminated by setting FF2 equal to −FR.

After exiting from routine 820, or from the step 810, if the clock FF2 is not triggered, the program enters step 880, in which it is determined whether or not the clock FF5 is triggered. FF5 controls the extinguishing of points in the section of the fast path between the pathological spot and the distal AV node. If the clock FF5 is greater than −FR, then it has been triggered and the program enters routine 890, which is similar to the routine 820 to extinguish the points in the distal section of the fast path, progressing in the antegrade direction. If there is no pathological spot, FF2 is not triggered and FF5 controls the extinguishing of the entire fast path.

After exiting from the routine 890, or from the step 880 if the clock FF5 is not triggered, the program enters routine 950, for controlling the extinguishing of the fast path in the retrograde direction. In this routine, the program determines whether either of the clocks FF4 or FF6 have been triggered by determining if they are greater than −FR and if so, carries out an extinguishing routine for the fast path similar to the routines 820 or 890. The clock FF4 is for the proximal section of the fast path between the pathological spot and the proximal junction of the AV node and when this clock is triggered, the program carries out a routine for extinguishing this section of the fast path. The clock FF6 is for the distal section of the fast path between the pathological spot and the distal junction and the program carries out a routine for extinguishing the distal section of the fast path when this clock is triggered. If there is no pathological spot, the clock FF4 is not triggered and the clock FF6 controls the extinguishing of the entire path.

Following the routines 950, the program enters the routines 1220 for controlling the conduction in the slow path. In these routines it is determined whether or not any of the slow path conduction clocks S1, S2, S3 or S4 have been triggered These clocks equal 0 when they are untriggered and do not equal 0 when they are triggered. The clocks S1 and S2 control conduction in the slow path in the antegrade direction and the clocks S3 and S4 control conduction in the slow path in the retrograde conduction. If the clock S1 has been triggered, the program increments the clock S1 by the value E on each iteration through the routine. In addition the program lights a point in the slow path corresponding to the value of S1 and lights a point in the AV nodal section 93 of the ladder display corresponding to the value of S1. Since the rate of conduction in the slow path, as controlled by the value E, may be equal to ½, the lighting of successive points in the slow path and in the ladder is carried out only when the value of S1 is increased to the next integer. After each point in the slow path is lit, the next point to be lit in the slow path is checked to see if it is already lit. If the next point is already lit, a line is drawn at the corresponding point in the AV nodal section 93 of the ladder diagram and the clock S1 is set back to its untriggered state of 0 to cease conduction activity by this clock. When the value of S1 increases to a value greater than 10, this means that the conduction through the slow path in response to the S1 clock has been completed and accordingly, further conduction activity in response to this clock is terminated by setting S1 equal to 0. In addition, upon S1 exceeding 10, if there is no block at the AV distal node, then it is determined whether the His bundle is refractory by examining the value of the His bundle clock H in conjunction with the value of the parameter HT in the same manner as described above with reference to the routine 660. If the H path is not refractory, the program triggers the H clock by setting it to 1. If the H path is refractory, a line is drawn in the ladder diagram to indicate the block of conduction in the His bundle in the ladder diagram. Also, on the value of S1 exceeding 10, the entrance to the fast path, where it connects to the distal junction is tested, to see if it is lit. If it is not lit, the clock FF3 is triggered to initiate conduction in the retrograde direction through the fast path. Also, if the parameter PFL is 5, indicating that a pathological spot is at the distal entrance of the fast path, then the spot refractory clock PF3 is triggered. If in routine 1220, the clock S2 is found to be triggered, a similar routine is carried out to control the conduction in the slow path in response to the value of S2.

If either of the clocks S3 or S4 is found to be triggered, that is not being equal to 0, then the program controls conduction in the slow path in the retrograde direction in a similar manner with the value of the clock S3 or S4 increasing on each iteration through the routine. The conduction through the slow path in the retrograde direction will reach the proximal AV junction when the value of S3 or S4 exceeds the value of 10. When this occurs, the program tests the entrance to the fast path at the proximal junction to see if it is lit and if not, triggers conduction in the fast path by setting the clock FF1 to 1. In addition, the atrium is tested to see if the atrium is not refractory by determining if T is greater than the parameter AR. If the atrium is not refractory, then an ectopic atrial beat is triggered in the same manner as described with reference to the routine 740 when conduction through the fast path in the retrograde direction reaches the proximal AV node.

Following the routine 1220, the program enters into the routines 1310 for controlling extinguishing of the points in the slow path. In this routine, if any of the clocks S5, S6, S8 or S9 are greater than the value minus SR, then this means that this clock is triggered and the program will carry out a routine to extinguish points in the slow path in accordance with the triggered clock. For example, if the clock S5, which controls extinguishing of the slow path in the antegrade direction, is triggered, the value of S5 will be incremented by the value of the parameter E on each cycle through the routine 1310. After the value of S5 becomes positive, the program begins to extinguish points in the slow path. In this manner SR sets the refractory period for the points in the slow path. Each time S5 increases to the next integer, a corresponding point in the slow path will be extinguished. When the value of S5 reaches 10 or when it is determined that the next point in the slow path is already extinguished, this means that the extinguishing activity in response to the clock S5 should be terminated and accordingly, the clock S5 is set back to its untriggered state, −SR.

If in the routines 1310, it is determined that the clock S8, which is also a clock for controlling extinguishing progressing in the antegrade direction, is triggered, then the program carries out a similar routine in response to the values of S8. If either the clock S6 or S9 is triggered, then the program carries out a similar routine in response to the value of the triggered clock, but in this case the extinguishing of the slow pathway will progress in the retrograde direction.

Upon exiting from the routine 1310, the program enters step 1390 to determine whether the His bundle clock H has been triggered. If it has been triggered, then the program enters routine 1400 for conduction in the His bundle. Each time the program cycles through this routine, the His clock H will be incremented. The His bundle 35 is divided into a top segment and a bottom segment which are lit in sequence with increasing values of H. If the value of HT is equal to 0, meaning that the conduction in the His bundle is normal rather than retrograde, then when H=1, the top segment of the His bundle 35 will be lit and when H=2, the bottom segment of the His bundle 35 will be lit. When H=3, if the ventricle is not refractory, as indicated by the value of the ventricular clock Q, being less than the ventricular refractory period VR and if there is no block in the right bundle branch indicated by the value B not being 3, then the right bundle branch is lit. In addition, the left bundle branch will be lit if there is no block in the left bundle branch as indicated by the value of B not being 4. Also when H=3, the ventricular clock Q is triggered by setting it equal to 1.

If in the routine 1400, the parameter HT is 1, indicating that the conduction in the His bundle is retrograde, then when H=1, the bottom segment this His bundle 35 will be lit and when H=2, the top segment of the His bundle 35 will be lit. When H=3, the entrance to the fast and slow paths 75 and 77 at the distal junction 79 are tested to see if they are lit and if they are not lit conduction in these paths is initiated by triggering the appropriate clocks in the same manner as described above.

Upon exiting from the routine 1400 or from the step 1390 if H=0, the program enters decision step 1460, in which it is determined if the value of the clock T is equal to the atrial refractory time AR. If T=AR, the program enters routine 1460a to extinguish the paths 32 through 33 in the atrium and the sinus node 31. Upon exiting the routine 1460a or from the step 1460, if T does not equal AR, the program enters decision step 1470, in which the parameter value of the clock SS is examined. The clock SS serves to measure the retrograde cycle length and it is triggered when retrograde conduction in the slow path is initiated. It will have a value greater than 0 when triggered, in which case the program will branch into routine 1475, in which the clock SS is incremented. If in routine 1475, the value of the clock SS equals the value of the slow path refractory time SR, the value of the parameter ER is set to 0.5 to cut the conduction speed in the retrograde direction in the slow path to ½ normal speed. Upon the value of the clock SS reaching the value of the parameter MI, then the value of the parameter ER is set back to 1 to bring the retrograde conduction speed in the slow path back to normal and the clock SS is set to its untriggered state of 0.

The program, after exiting from the routine 1475 or from the decision step 1470 if the clock SS is not triggered, enters step 1509, in which the value of the clock T is incremented, whereupon the program returns to the routine 65 to respond to operator prompts as shown in FIG. 3 and then the routine 69 will repeat for the next value of T.

As explained above, if the operator has selected a pacemaker option, the programmer enters subroutine 2500 to carry out a routine in accordance with the options selected by the operator. Five of the operator options correspond to different pacemakers and the sixth pacemaker option corresponds to ventricular parasystole. When the operator has selected the ventricular parasystole option, the parameter Z will have been set to 6. In this case the program routine first increments a clock QP, which is a clock to control when the ventricle is artificially stimulated in the pacemaker routines. Then if the clock QP is not greater than the ventricular escape interval VE, the program exits the routine. If the clock QP has been incremented to a value greater than VE, then the routine sets QP back to 0 and draws a circle in the ventricle of the heart and the ventricle section of the ladder to indicate stimulation of the ventricle by the ventricular parasystole syndrome. Thereupon the program determines if the ventricle is refractory by determining if Q is less than VR. If Q is less than VR, the program exits the routine. However, if Q is equal to or greater than VR, then the program causes an ectopic ventricular beat by setting Q−2 and V=1.

As indicated above, if the operator has selected the experimental pacemaker, then the value of Z will have been set to 1. In this case the program, when it branches into the routines 2500, will carry out the routine illustrated in the flow chart of FIGS. 14a and 14b. The operation of the other pacemakers, which can be selected by the operator are not represented in detail in the flow charts, but the operation of the program to simulate these other pacemakers can be readily understood from the program listing in the appendix and from the description of the operation of the experimental pacemaker given below with reference to FIGS. 14a and 14b.

Figure 14A:
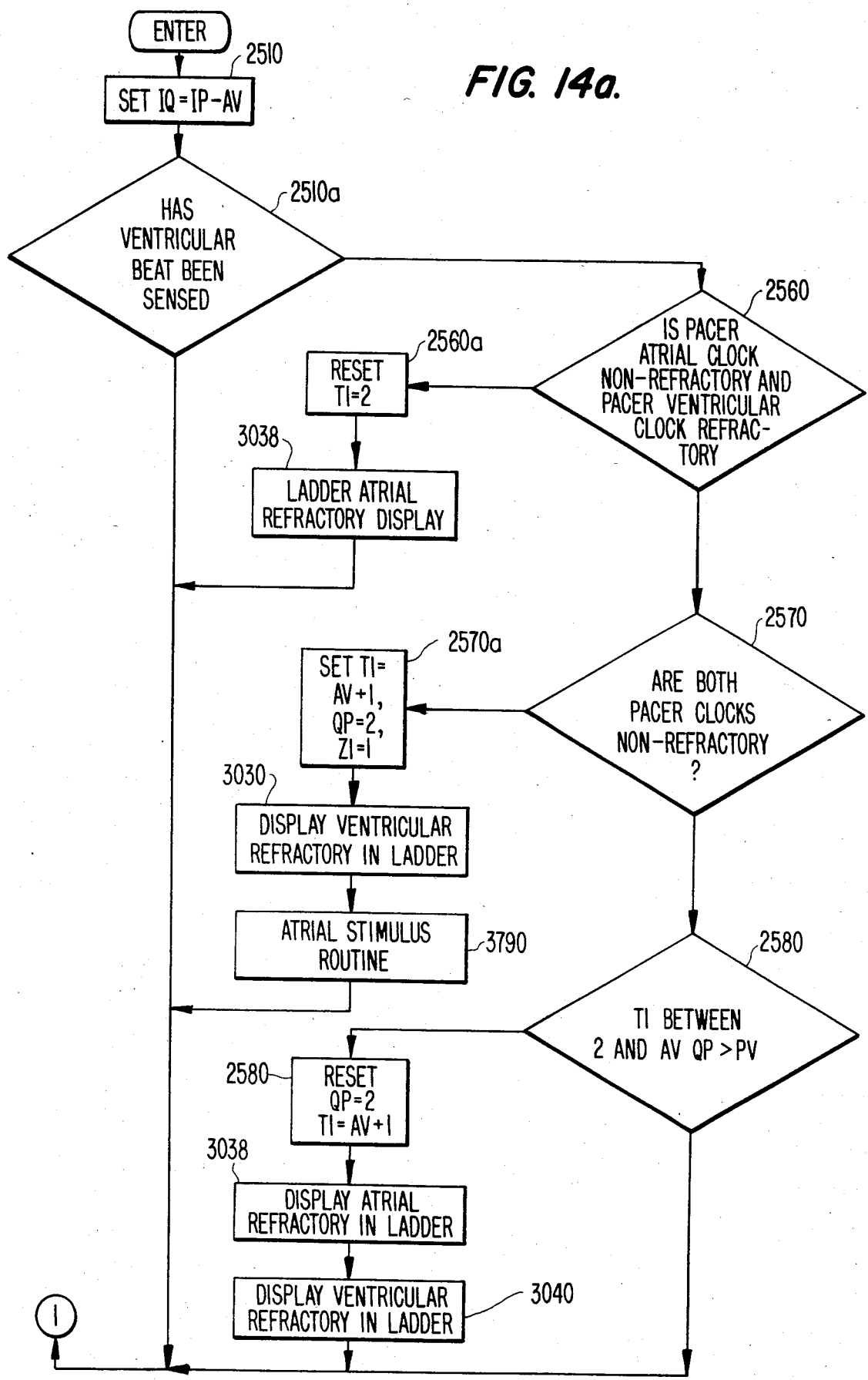
FIGS. 14a and 14b illustrate a flow chart of another subroutine employed in the program illustrated in FIGS. 12a-12f.
Figure 14B:
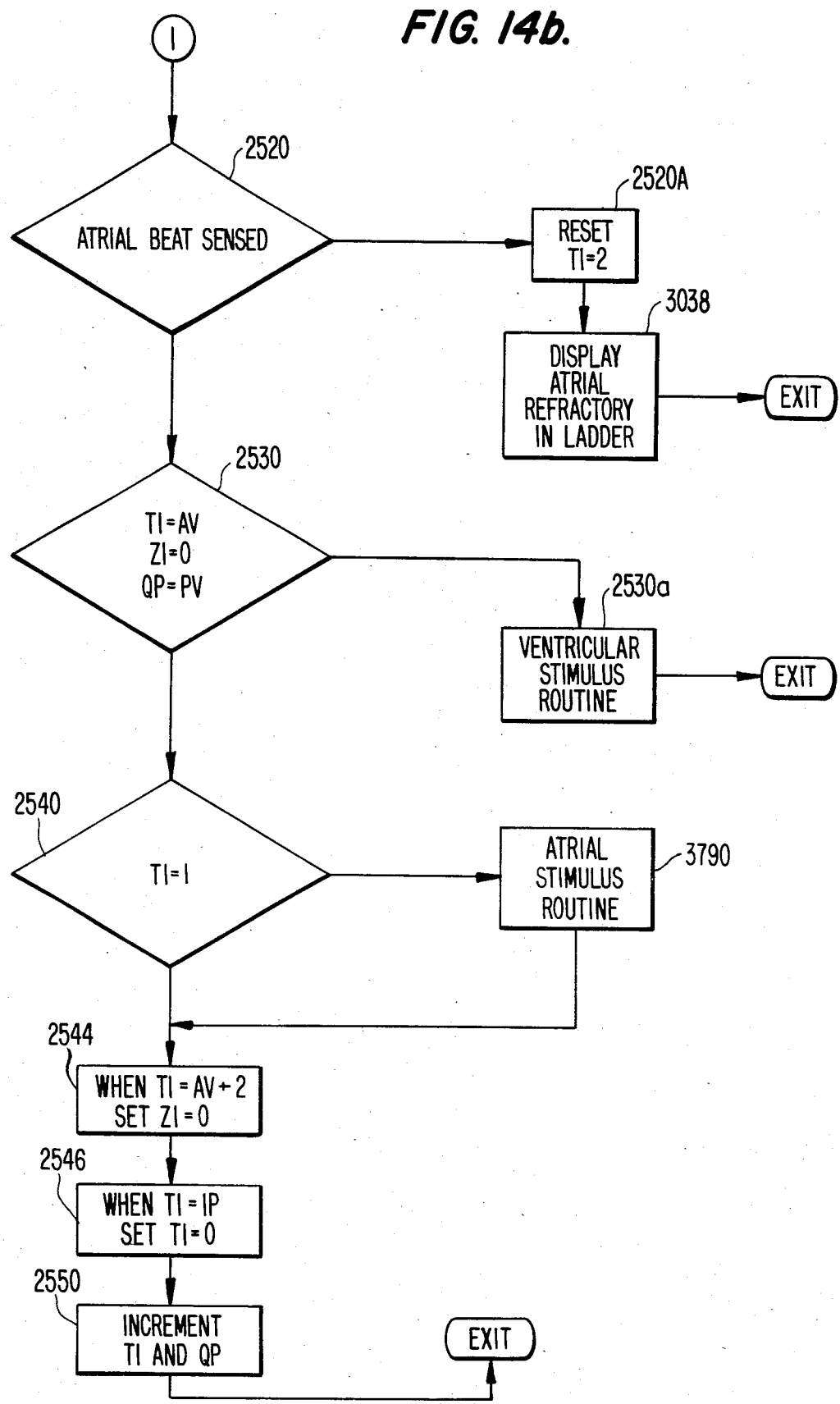

As shown in FIG. 14a, the routine to stimulate the experimental pacemaker first enters step 2510, in which the parameter IQ is set to equal IP−AV. IP is the pacemaker atrial interval, IQ is the pacemaker ventricular interval and AV is the delay provided in the pacemaker between atrial stimulations and ventricle stimulations. Following step 2510, the program enters into decision step 2510A, in which the program determines whether a ventricular beat has been sensed by the pacemaker. The pacemaker is provided with two clocks T1 and QP. T1 controls the stimulation of the atrium and QP controls stimulation of the ventricle. The pacemaker will be insensitive to sense a ventricle beat if T1 is not greater than 2 and QP is not greater than 3. If T1 is greater than 2, and QP is greater than 3, then a ventricular beat is sensed when the ventricular clock Q=2. Upon this occurance, the program branches from decision step 2510a to decision step 2560, in which the program determines whether the pacemaker ventricular clock QP is less than its refractory period PV and at the same time if the atrial clock T1 is greater than its refractory period, which is determined by the parameter PA+the parameter AV. If both of these conditions prevail, the atrial clock is to be reset without causing an atrial beat. Accordingly under these conditions the program branches to step 2560a and sets the pacemaker atrial clock T1 to 2. The pacer atrial clock stimulates an atrial beat when T1=1. Thus, by setting T1=2, the atrial clock in effect is reset without causing an atrial beat. After resetting the clock T1 to 2, the program enters program step 3038, in which a bar, like the bar 146 in FIG. 11, is displayed above the atrial section 91 of the ladder to indicate the refractory period of the atrial clock T1. Following step 3038, the routine enters decision step 2520.

If in decision step 2560, the atrial clock T1 is in its refractory period, or the ventricular clock QP is not in its refractory period, the program proceeds into decision sequence 2570, in which it is determined if both of the pacemaker clocks T1 and QP have exceeded their refractory periods. If so, the program enters routine 2570a. In this routine the atrial clock T1 is synchronized with the sensed ventricular beat by setting it equal to AV+1. In addition, the clock QP is reset without stimulating ventricular beat. This is done by setting the clock QP to 2. The clock QP will stimulate a ventricular beat when QP=1. In addition, a flag Z1 is set to 1, to prevent a ventricular stimulation in the next cycle. The program then enters into routine 3030, in which the program displays a bar, like the bar 147 in FIG. 11, below the ventricular section 95 of the ladder diagram, to represent the ventricular refractory period for the pacemaker. The program then enters the atrial stimulus routine 3790, in which it effects stimulation of the atrium. If the atrium is not in its refractory period, as indicated by the clock T being less than AR, an atrial beat is caused. If the clock T is not less than AR, then an ectopic atrial beat is caused by setting T=1 and P=1. In addition, if the value of T is less than the parameter MI, then the conduction rate in the slow path is set to 0.5. In addition, in the routine 3790, the program will display the artificial stimulation of the atrium in the heart by displaying a circle, like the circle 131 in FIG. 11, in the atrium of the heart, in the ECG by drawing a vertical bar, like the bar 139, and in the ladder diagram by drawing a bar, like the bar 143, above the atrial section 91. In addition, a horizontal bar, like the bar 146, will be displayed to indicate the pacer atrial refractory period. Following the routine 3790, the program will enter decision step 2520.

If in decision step 2570 it is determined that both pacer clocks are not refractory, the program enters decision step 2580, in which it is determined if the pacer atrial clock T1 is greater than 2, but still in the AV delay period. If so, this means that a ventricle beat was sensed during the AV delay period and accordingly, the pacer ventricle pacer clock QP is set to 2 to reset it without stimulating a ventricle beat and the pacer atrial clock is synchronized with the ventricle beat by setting T1 to AV+1. Then following instruction sequence 2580, the program proceeds through steps 3038 and 3040 to display the atrial and ventricle refractory periods in the ladder diagram by bars, like the bars 146 and 147. After exiting from the steps 3038 and 3040, or from the decision step 2580, if the atrial clock T1 is not between 2 and AV, the program enters decision step 2520. In addition, if a ventricle beat is not sensed in step 2510a, the program will proceed directly into decision step 2520.

In decision step 2520, the program determines whether an atrial beat is sensed by determining when T=2. When T=2, the program branches into step 2520a to set the pacer atrial clock T1 to 2 in order to reset it without stimulating an atrial beat. The program then enters step 3038 to display the atrial refractory period in the ladder diagram and then exits from the pacer routine and back to the main program.

When an atrial beat is not sensed in step 2520, the program then proceeds into decision sequence 2530, in which it is determined whether or not the pacer atrial clock has reached the value of the pacer atrial ventricular delay, as determined by the parameter AV. If T1=AV and Z1=0 and the pacer ventricular clock QP is greater than the pacer refractory period PV, then the program branches to routine 2530a to carry out the ventricular stimulation routine. In this routine, the atrial clock T1 is synchronized with the ventricular beat to be produced by setting it to AV+1 and the ventricular clock QP is reset to 0. If the ventricle of the heart is not in its refractory period as determined by Q being less than VR, an ectopic ventricular beat is stimulated by setting Q=1 and V=1. Whether or not the ventricle is refractory, a circle like the circle 133 is drawn in the ventricle of the heart, a vertical bar like the bar 145 is drawn in the ladder section 95 of the ladder diagram and a vertical bar 141 is drawn in the ECG, to represent the artificial ventricle stimulation. In addition, the program displays a set of points, like the points 148 in FIG. 11, connecting the vertical bars 143 and 145 in the ladder diagram to represent the relationship between the two stimulations, and horizontal bars like the bars 146 and 147 are displayed to represent the pacer atrial and ventricle refractory periods. Following routine 2530a, the program exits from the pacemaker routine and returns to the main program.

When in decision step 2530, T1 does not equal AV, or Z1 does not equal 0 or QP is not greater than the ventricular refractory period PV, then the program proceeds into decision step 2540, in which it is determined whether the atrial clock T1=1. If so, this means that it is time for the pacer to stimulate an atrial beat and the program branches into routine 3790 to carry out the atrial stimulation routine in the same manner described above. Upon completion of the atrial stimulation routine 3790, or from decision step 2540 when T1 does not equal 1, the program enters routine 2544. In this routine the program resets the flag Z1 back to 0 when T1 reaches the value of AV+2. Following routine 2544, the program enters routine 2546, in which the program resets T1 to 0 when T1 reaches the value IP. The program then enters routine 2550, in which the clock T1 is incremented and the clock QP is incremented, whereupon the program exits from the experimental pacemaker routine and returns to the main program.

It will be appreciated that the simulated electrophysiological model of the heart, provided by the applicant's system and the display of the operation thereof will be a valuable teaching aid for medical students, cardiovascular experts and specialists, and will also provide a valuable diagnostic tool for cardiovascular specialists. The system will be of further value as an experimental tool to see how the heart operates under various conditions, including different pacemaker stimuli and under different restraints or parameters in the heart.

While the applicant's invention is particularly useful and adapted for simulating the electrophysiological operation of a heart, the concept of the invention is applicable to simulating electrophysiological models of other parts of the body. The above description of the invention is of a preferred embodiment of the invention and modification may be made thereto without departing from the spirit and scope of the invention, which is defined in the appended claims.

What is claimed is:

1. A heart display system comprising computer means including means to define an electrophysiological network of conduction pathways in a selected pattern corresponding to a specific type of heart, means to store and monitor the electrophysiological state of the component parts of said pathways, and means to determine the travel of depolarization waves that occur in said pathways from the pattern of said pathways and by the electrophysiological state of said component parts and in response to predetermined parameters, to thereby simulate the electrophysiological operation of a beating heart, and means to display a representation of the operation of said heart in accordance with the travel of said waves of depolarization in said pathways.

2. A heart display system, as recited in claim 1, wherein said pathways are divided into linearly connected segments and wherein said computer means includes means to store and monitor the electrophysiological state of said segments as said heart operates.

3. A heart display system, as recited in claim 2, wherein said computer means including means to determine whether a depolarization wave travelling in said pathways travels from one segment to an adjacent segment in accordance with the electrophysiological condition of said adjacent segment, said computer means effecting travel of a depolarization wave to the adjacent segment only if it is polarized.

4. A heart display system, as recited in claim 3, wherein the pattern of said electrophysiological pathways, defined by said computer means, correspond to a heart with dual pathways in the atrioventricular node.

5. A heart display system as recited in claim 3, wherein said pattern of pathways is divided into a first section representing the atrium of said heart, a second section representing the ventricle of said heart, and a third section representing the atrial ventricular node of said heart connected between said first and second sections, said third section comprising at least one linear pathway extending from said first section to said second section and being divided into a plurality of said segments.

6. A heart display system as recited in claim 5, wherein said linear pathway of said second section connects to said first section at a proximal junction and connects to said second section at a distal junction, and wherein said third section includes a second linear pathway extending between said proximal and distal junctions and divided into a plurality of said segments.

7. A heart display system, as recited in claim 1, wherein said computer means is operable to select one of a plurality of different patterns of electrophysiological conduction pathways.

8. A heart display system, as recited in claim 7, wherein one of said patterns of pathways corresponds to a heart with dual pathways in the atrioventricular node and one of said patterns corresponding to a heart with a single pathway in said atrial ventricular node.

9. A heart display system, as recited in claim 8, wherein one of said pathway patterns corresponds to a heart with a Wolfe-Parkinson-White Syndrome.

10. A heart display system, as recited in claim 1, wherein said pattern of electrophysiological conduction pathways correspond to a heart with a Wolfe-Parkinson-White Syndrome.

11. A heart display system, as recited in claim 1, wherein said display means displays said pattern of said pathways and displays an animation of the travelling depolarization waves form in said pathways.

12. A heart display system, as recited in claim 11, wherein said computer means controls the animation of the travel of depolarization wave in said pattern of pathways by dividing said pathways into segments, and causes said display means to display each segment of the pathways with a first visual characteristic when the segment is polarized and display each segment with a second different visual characteristic from said first visual characteristic when said such segment is depolarized.

13. A heart display system, as recited in claim 12, wherein said computer means determines whether a depolarization wave travels from one segment of said pattern of pathways to an adjacent segment by whether the adjacent segment is represented by said first visual characteristic or said second visual characteristic and effects travel of said depolarization wave into said adjacent segment only if said adjacent segment is displayed with said first visual characteristic.

14. A heart display system, as recited in claim 11, wherein said display means displays a ladder diagram corresponding to the operation of the simulated heart.

15. A heart display system, as recited in claim 14, wherein said display means displays an ECG wave form corresponding to the operation of the simulated heart.

16. A heart display system, as recited in claim 11, wherein said display means displays an ECG wave form corresponding to the operation of the simulated heart.

17. A heart display system, as recited in claim 1, wherein said display means displays a ladder diagram corresponding to the operation of the simulated heart.

18. A heart display system, as recited in claim 1, wherein said display means displays an ECG wave form corresponding to the operation of the simulated heart.

19. A heart display system, as recited in claim 1, wherein said computer means defines a simulated pacemaker operable to be connected to said heart and to cause stimulation of the heart in accordance with the parameters of said predetermined pacemaker.

20. A heart display system, as recited in claim 1, wherein said pathways are divided into segements, and wherein said computer means includes means to store and monitor the electrophysiological state of said segments as said heart operates, said computer means determining whether a depolarization wave traveling in said pathways travels from one segment to an adjacent segment in accordance with the electrophysiological condition of the adjacent segment and effecting travel of a depolarization wave to the adjacent segment only if it polarized, said computer means determining whether at least one segment of said pathways is polarized or depolarized by setting a clock value for said one segment at the time said one segment is depolarized, periodically incrementing said clock value, and permitting a depolarization wave to travel into said one segment only when said clock value has been incremented to a predetermined value.

21. An electrophysiological simulation and display system comprising computer means including means to define an electrophysiological network of conduction pathways in a selected pattern means, to store and monitor the electrophysiological condition of component parts of said pathways, and means to determine the travel of depolarization waves that occur in said pathways from the pattern of said pathways and from the electrophysiological state of said component parts and in response to predetermined parameters, to thereby simulate the electrophysiological conduction in said pathways, and means to display said pattern of pathways and to display an animation of the travelling depolarization waves in said pathways.

22. An electrophysiological simulation and display system, as recited in claim 21, wherein said computer means controls the animation of the travel of depolarization waves in said pattern of pathways by dividing the pathways into segments, and causes said display means to display each segment of the pathways with a first visual characteristic when the segment is polarized and display each segment with a second visual characteristic different from said first visual characteristic when such segment is depolarized.

23. An electrophysiological display system, as recited in claim 22, wherein said computer means determines whether a depolarization wave travels from one segment of said pattern of pathways to an adjacent segment by whether the adjacent segment is represented by said first visual characteristic or said second visual characteristic and effects travel of said depolarization wave into said adjacent segment only if said adjacent segment is displayed with said first visual characteristic.

* * * * *